(12) United States Patent
Rigetti et al.

(10) Patent No.: US 10,140,404 B2
(45) Date of Patent: Nov. 27, 2018

(54) ANALYZING QUANTUM INFORMATION PROCESSING CIRCUITS

(71) Applicant: RIGETTI & CO., INC., Berkeley, CA (US)

(72) Inventors: Chad T. Rigetti, Emeryville, CA (US); Eyob A. Sete, Walnut Creek, CA (US)

(73) Assignee: Rigetti & Co, Inc., Berkeley, CA (US)

( * ) Notice: Subject to any disclaimer, the term of this patent is extended or adjusted under 35 U.S.C. 154(b) by 0 days.

(21) Appl. No.: 15/301,051

(22) PCT Filed: Nov. 6, 2015

(86) PCT No.: PCT/US2015/059467
§ 371 (c)(1),
(2) Date: Sep. 30, 2016

(87) PCT Pub. No.: WO2017/078731
PCT Pub. Date: May 11, 2017

(65) Prior Publication Data
US 2017/0228483 A1    Aug. 10, 2017

(51) Int. Cl.
*G06F 17/50*    (2006.01)
*G06N 7/00*    (2006.01)
(Continued)

(52) U.S. Cl.
CPC ........ *G06F 17/5036* (2013.01); *G06F 17/505* (2013.01); *G06F 17/5018* (2013.01);
(Continued)

(58) Field of Classification Search
None
See application file for complete search history.

(56) References Cited

U.S. PATENT DOCUMENTS

| | | | |
|---|---|---|---|
| 6,943,368 B2 * | 9/2005 | Amin | B82Y 10/00 257/31 |
| 6,960,780 B2 * | 11/2005 | Blais | B82Y 10/00 257/14 |

(Continued)

FOREIGN PATENT DOCUMENTS

| | | |
|---|---|---|
| WO | 2015/178990 | 11/2015 |
| WO | 2015/178991 | 11/2015 |
| WO | 2015/178992 | 11/2015 |

OTHER PUBLICATIONS

K. M. Svore et al., "A Layered Software Architecture for Quantum Computing Design Tools," Computer, Published by the IEEE Computer Society, Jan. 2006, pp. 74-83.*

(Continued)

*Primary Examiner* — Leigh Garbowski
(74) *Attorney, Agent, or Firm* — Henry Patent Law Firm PLLC

(57) ABSTRACT

In a general aspect, a quantum information processing circuit is analyzed. In some implementations, a linear response function of a quantum information processing circuit is generated. A linear circuit model is generated based on the linear response function. A composite circuit model is generated by combining the linear circuit model and a nonlinear circuit model. An operating parameter of the quantum information processing circuit is computed by solving the composite circuit model. In some implementations, an electromagnetic structure solver determines the linear response function based on a circuit specification, a quantum circuit analysis tool calculates the operating parameters, and the circuit specification is modified based on the operating parameters.

26 Claims, 10 Drawing Sheets

(51) Int. Cl.
*G06N 7/04* (2006.01)
*G06N 99/00* (2010.01)

(52) U.S. Cl.
CPC ............... *G06N 7/00* (2013.01); *G06N 7/04* (2013.01); *G06N 99/00* (2013.01); *G06N 99/002* (2013.01); *G06F 2217/12* (2013.01); *Y02P 90/265* (2015.11)

(56) References Cited

U.S. PATENT DOCUMENTS

| | | | | |
|---|---|---|---|---|
| 7,180,645 | B2* | 2/2007 | Azuma | B82Y 10/00 359/107 |
| 7,447,719 | B2* | 11/2008 | Goto | B82Y 10/00 708/191 |
| 7,509,247 | B2 | 3/2009 | Jiao et al. | |
| 7,529,717 | B2* | 5/2009 | Vala | B82Y 10/00 706/12 |
| 7,590,607 | B2* | 9/2009 | Williams | B82Y 10/00 706/45 |
| 8,671,369 | B2 | 3/2014 | Ahn | |
| 8,972,237 | B2 | 3/2015 | Wecker | |
| 9,614,532 | B1* | 4/2017 | Bulzacchelli | H03K 19/195 |
| 9,692,423 | B2* | 6/2017 | McDermott, III | H03K 19/1954 |
| 9,767,238 | B2* | 9/2017 | Oberg | G06F 17/5031 |
| 2002/0016704 | A1† | 2/2002 | Blanks | |
| 2003/0121028 | A1 | 6/2003 | Coury et al. | |
| 2008/0177996 | A1† | 7/2008 | Simar et al. | |
| 2017/0091647 | A1† | 3/2017 | Abdo | |
| 2017/0177534 | A1† | 6/2017 | Mohseni et al. | |
| 2017/0214410 | A1† | 7/2017 | Hincks et al. | |

OTHER PUBLICATIONS

United States International Searching Authority; International Search Report & Written Opinion for PCT/US2015/059467; dated Jul. 26, 2016; 10 pages; Alexandria, VA; US.

Ansys, Ansys HFSS Brochure, Accessed online Oct. 27, 2015 at http://www.ansys.com/Products/Simulation+Technology/Electronics/Signal+Integrity/ANSYS+HFSS, 2 pages.

Brune, Otto; "Synthesis of a Finite Two-terminal Network Whose Driving-point Impedance is a Prescribed Function of Frequency," Doctoral Thesis from the Massachusetts Institute of Technology, dated Jan. 1932, 134 pages.

Burkard, G., et al.; "Multilevel quantum description of decoherence in superconducting qubits," Physical Review B 69, 064503, Feb. 2004, 20 pages.

Burkard, G.; "Circuit theory for decoherence in superconducting charge qubits," Physical Review B 71, 144511, Apr. 2005, 7 pages.

DiVincenzo, D. P., et al.; "Decoherence rates in complex Josephson qubit circuits," Physical Review B 74, 014514, Jul. 2006, 15 pages.

Solgun, F., et al.; "Blackbox quantization of superconducting circuits using exact impedance synthesis," Physical Review B 90, 134504, Oct. 2014, 12 pages.

Nigg, S. E., et al.; "Black-Box Superconducting Circuit Quantization," Physical Review Letters 108, 240502, Jun. 2012, 5 pages.

EPO, Extended European Search Report dated Dec. 13, 2017 in EP15889427.9, 12 pgs.

Devoret, et al., "Superconducting Circuits for Quantum Information: An Outlook", Science 339, 1169-74, Mar. 2013, 7 pgs.

Peterer, et al., "Coherence and Decay of Higher Energy Levels of a Superconducting Transmon Qubit", Physical Review Letters, vol. 114, No. 1, Jan. 1, 2015, 5 pgs.

EPO, Communication pursuant to Article 94(3) EPC dated Sep. 3, 2018, in EP15889427.9.

Svore, Krysta M, et al, Toward a software architecture for quantum computng design tools, Proc QPL 2004, pp. 145-162, 2004.†

Lin Song et al, Computational synthesis of any n-qubit pure or mixed state, Aug. 4, 2003, AeroSense 2003, Orlando FL US.†

Whitney, Mark, et al., Automated generation of layout and control for quantum circuits Proceedings of the 4th international conference on Computing frontiers, ACM, 2007.†

Svore, Krysta M., et al., Toward a software architecture for quantum computing design tools, QPL 2004 pp. 145-162.†

Song, Lin, and Colin P. Williams, Computational synthesis of any N-Qubit pure or mixed state, Aug. 4, 2003, AeroSense 2003 Conference Orlando FL.†

Zhou, Zhongyuan et al Quantum computing with supersonducting devices A three-level SQUID qubit, Published 2002, Physical Review B 66, 054527, 2002.†

\* cited by examiner
† cited by third party

| 450 | $C_j$ (nF) | $L_j$ (nH) | Turn ratio: $n_j$ | $R_j$ (Ohm) |
|---|---|---|---|---|
| Stage 1 | $6.53 \times 10^{-5}$ | 0.11 | 0.04 | $2.30 \times 10^{-4}$ |
| Stage 2 | $8.16 \times 10^{-5}$ | 6226 | 0.94 | 2.98 |
| Stage 3 | $7.14 \times 10^{-5}$ | 0 | $\infty$ | 153.37 |
| Shunt Resistor | | | | $1.59 \times 10^9$ |

| 470 | $f_q$ (GHz) | $f_r$ (GHz) | $\eta/2\pi$ (MHz) | $T_1$ (μs) | $T_2$ (μs) | $\chi/2\pi$ (MHz) | $2g/2\pi$ (MHz) |
|---|---|---|---|---|---|---|---|
| Simulation | 4.537 | 7.050 | 346 | 33 | 62 | 0.25 | 142 |
| Measured | 4.455 | 7.081 | 350 | -- | -- | -- | -- |

ANALYZING QUANTUM INFORMATION PROCESSING CIRCUITS

BACKGROUND

The following description relates to analyzing quantum information processing circuits.

Quantum information processing circuits can be fabricated on chips and used for processing quantum information. For example, superconducting electronic circuits that include superconducting qubit devices coupled to cavities can be used for quantum information processing. The superconducting qubits can be implemented, for example, using Josephson-junction devices that have a nonlinear inductance.

SUMMARY

In a general aspect, quantum information processing circuits are analyzed, for example, to determine their operating parameters.

In some aspects, one or more operating parameters of a quantum information processing circuit are determined. A linear response function of a quantum information processing circuit is generated. A linear circuit model is generated based on the linear response function. A composite circuit model is generated by combining the linear circuit model and a nonlinear circuit model. An operating parameter of the quantum information processing circuit is computed based on the composite circuit model.

In some aspects, a quantum information processing circuit is designed. A circuit specification of a quantum information processing circuit is obtained. An electromagnetic structure solver, executed by one or more processors in a computer system, determines a linear response function of the quantum information processing circuit based on the circuit specification. A quantum circuit analysis tool, executed by one or more of the processors in the computer system, determines simulated operating parameters of the quantum information processing circuit based on the linear response function. The circuit specification is modified based on the simulated operating parameters.

In some cases, implementations of these and other aspects may provide one or more advantages. For example, quantum circuit analysis tools may allow faster and more accurate design processes that consume less computation time and resources. The quantum circuit analysis tools can be used, for example, in computer-implemented design processes that combine classical calculations and quantum mechanical calculations in a systematic and efficient manner. In some examples, a quantum circuit analysis tool can construct a quantum Hamiltonian and estimate all operating parameters of a quantum information processing circuit, for instance, without building the quantum processor chip. In some cases, the techniques described here can reduce the number of iteration needed to optimize parameters of a quantum device. In some examples, the quantum circuit analysis tool can generate all, or a subset, of the operating parameters for single-port or multi-port circuits, for instance, in a single run or in multiple runs. In some implementations, a quantum circuit analysis tool can be imbedded in an application and activated conveniently based on user input, for instance, input received through the application's graphical user interface (GUI). As an example, a button or other GUI element in a classical solver application can be selected by the user to send classical analysis results to a quantum solver. In some examples, the techniques described here may be used to analyze loss mechanisms in superconducting qubits, to design and more accurately simulate complex quantum information processing circuits, to analyze various types of quantum mechanical elements (e.g., various types of qubits, quantum limited amplifiers, etc.) or for other purposes.

The details of one or more implementations are set forth in the accompanying drawings and the description below. Other features, objects, and advantages will be apparent from the description and drawings, and from the claims.

DESCRIPTION OF DRAWINGS

FIG. 3A shows the real component; FIG. 3B shows the imaginary component.

DETAILED DESCRIPTION

Figure 1A:
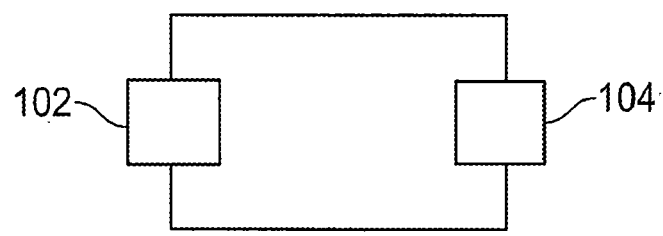
FIG. 1A is a schematic diagram of an example quantum information processing circuit.

In some aspects of what is described here, a simulation-driven design tool can be used to design quantum devices and quantum integrated circuits. The design and fabrication of reliable quantum circuit elements can be used, for instance, to build quantum computers or for other applications. In some implementations, a quantum circuit analysis tool can handle nonlinear circuit elements (e.g., quantum mechanical objects, such as qubit devices) and accurately compute important operating parameters of a quantum information processing circuit. Such a tool may, in some cases, validate or otherwise test a quantum information processing circuit design more efficiently than some other techniques. The quantum circuit analysis tool may be combined with other tools (e.g., a linear electromagnetic structure simulator) to design and accurately describe the properties of quantum devices such as superconducting qubits, resonators, quantum limited amplifiers, etc.

In some implementations, a quantum integrated circuit includes linear elements (e.g., linear resonators), which can be simulated classically, and one or more nonlinear elements (e.g., qubit devices), which should be treated quantum mechanically. In some cases, multilevel models for qubit devices and multi-mode models for resonators can enable more accurate extraction of the circuit's operating parameters. For instance, when dealing with nonlinear quantum mechanical objects that have multiple energy levels, multi-mode cavities, and increased coupling strengths, single-mode resonator approximations may not accurately capture some important effects or allow extraction of some operating parameters. In some implementations, multi-mode models can capture off-resonance cavity modes that may contribute to qubit-cavity and inter-qubit couplings, and may also affect the relaxation and coherence properties of qubits.

In some implementations, a linear response function (e.g., an impedance function or admittance function) of the quantum circuit is computed using a classical solver, for instance, using a finite element electromagnetic structure solver. In some cases, the numerical data from the classical solver can be vector fitted in a manner that imposes passivity and positive real conditions. Classical circuit synthesis algorithms (e.g., the Brune circuit synthesis algorithm) can then be used to determine, based on the positive real response function, an equivalent linear circuit that reproduces the linear response function. A linear circuit model representing the equivalent linear circuit can be used to construct the linear part the Hamiltonian for the quantum circuit. The nonlinear elements can then be combined with the equivalent linear circuit, for instance, as shunting inductances to the equivalent linear circuit. A composite Hamiltonian for the quantum circuit can be constructed, for instance, by adding the Hamiltonian of the nonlinear elements to the Hamiltonian of the equivalent linear circuit. The resulting composite Hamiltonian can be used, for instance, to solve the corresponding Schrödinger equations and obtain the physical operating parameters of the quantum circuit.

The operating parameters obtained based on the composite Hamiltonian can include parameters that describe operational aspects of the quantum circuit and are relevant to quantum information processing. Examples of the operating parameters that can be obtained include coherence times (e.g., $T_1$, $T_2$) that indicate the stability of the qubit devices, resonance frequencies that are used to address and manipulate the quantum states of the qubit devices, coupling strengths between qubit devices and the associated resonator devices that are used to detect the quantum states of the qubit devices, and others. In some cases, all operating parameters of interest for a quantum circuit can be obtained, for instance, based on higher-order solutions to the Schrödinger equation. For example, the number of operating parameters that can be obtained may increase with the order to which the Schrödinger equation is solved.

FIG. 1A is a schematic diagram of an example quantum information processing circuit 100. The quantum information processing circuit 100 shown in FIG. 1A is an example of a quantum integrated circuit that can be fabricated, for example, on a wafer to form a quantum processor chip. The example quantum information processing circuit 100 includes a qubit device 102 and a resonator device 104. The qubit device 102 can be a superconducting qubit device that includes a Josephson junction, and the resonator device 104 can be a cavity (e.g., a three-dimensional cavity resonator) or another type of resonator (e.g., a planar transmission line resonator). A quantum information processing circuit may include additional or different features, and the components of a quantum information processing circuit may be arranged or may operate in another manner.

In the example shown in FIG. 1A, the qubit device 102 can be used to encode and store a single bit of quantum information. The qubit device 102 has two eigenstates that can be used as computational basis states ("0" and "1"), and the qubit device 102 can transition between its computational basis states or exist in an arbitrary superposition of its basis states. The quantum state of the qubit device 102 can be manipulated by qubit control signals provided by the quantum information processing circuit. The qubit device 102 may have other eigenstates that are not used as computational basis states, and the other eigenstates can be accounted for in the analysis of the quantum information processing circuit 100. For example, during the design and analysis of the quantum information processing circuit 100, the quantum information processing circuit 100 can be described as a system with three or more quantum energy levels.

In some implementations, a quantum information processing circuit includes many (e.g., tens, hundreds, thousands, etc.) of qubit devices that are used for processing quantum information. In some examples, each qubit device has a fixed qubit operating frequency. For instance, a qubit device (e.g., a transmon qubit) may be implemented without a superconducting SQUID loop. In some examples, the operating frequency of a qubit device is tunable, for example, by application of an offset field. For instance, a qubit device (e.g., a fluxonium qubit) may include a superconducting SQUID loop that is tunable by application of magnetic flux. A qubit device can be driven at its qubit operating frequency (or in some cases, at another frequency) to manipulate the quantum state of the qubit. For example, a single-qubit gate can be applied to a qubit by applying a pulse that is configured to perform the single-qubit gate.

In the example shown in FIG. 1A, the resonator device 104 can be used to probe the quantum state of the qubit device 102. In some examples, the resonator device 104 has a resonance that depends on the quantum state of the qubit device 102. For example, the resonance frequency of the resonator device 104 can indicate the quantum state of the qubit device 102. In some cases, the resonator device 104 can be probed by a readout control signal, and the resonator device 104 can produce a qubit readout signal in response to the readout control signal. The properties of the qubit readout signal can indicate one of the two computational basis states of the qubit device 102. For instance, the resonator device 104 can produce a qubit readout signal by reflecting the readout control signal with additional information. The additional information can be, for example, a frequency shift, a phase shift, an amplitude shift, or a combination of these and other modifications, that indicates the state of the qubit device 102.

Figure 1B:
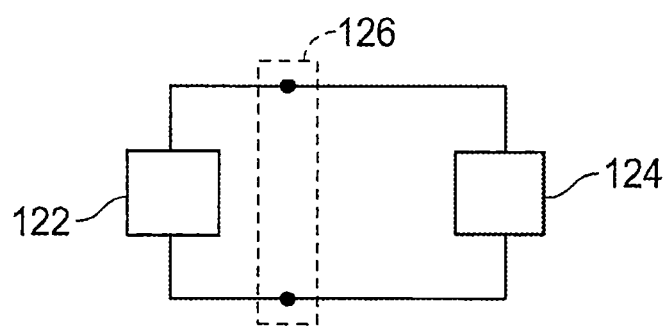
FIG. 1B is a schematic diagram of an example lumped circuit model for the quantum information processing circuit 100 shown in FIG. 1A.

In the example shown, the quantum information processing circuit 100 is a single-port system that includes one nonlinear circuit element (the qubit device 102) and one linear circuit element (the resonator device 104). In this example, the quantum information processing circuit 100 can be modeled as a lumped circuit. FIG. 1B is a schematic diagram of an example lumped circuit model 120 for the quantum information processing circuit 100 shown in FIG. 1A. The lumped circuit model 120 includes a nonlinear component 122 and a linear component 124. As shown in FIG. 1B, the nonlinear component 122 and the linear component 124 are connected by a single port 126 in the lumped circuit model 120.

In the example lumped circuit model 120 shown in FIG. 1B, the linear component 124 represents the linear elements of the quantum information processing circuit 100, which produce the linear response function of the quantum information processing circuit 100. The linear elements may include the resonator device 104 and one or more linear elements in the qubit device 102. The nonlinear component 122 represents the nonlinear elements of the quantum information processing circuit 100, which do not contribute to the linear response function of the quantum information processing circuit 100. The nonlinear elements of the example quantum information processing circuit 100 are contained in the qubit device 102. For instance, the nonlinear component of the lumped circuit model 120 can represent the nonlinear inductance ($L_J/\cos\varphi$) of a Josephson junction in the qubit device 102, with $\varphi$ being the phase across the junction, and the linear component 124 can represent the impedance $Z(\omega)$ seen from the Josephson junction port; the impedance $Z(\omega)$ can be a function of the resonator device 104 and linear elements of the qubit device 102.

Figure 2A:
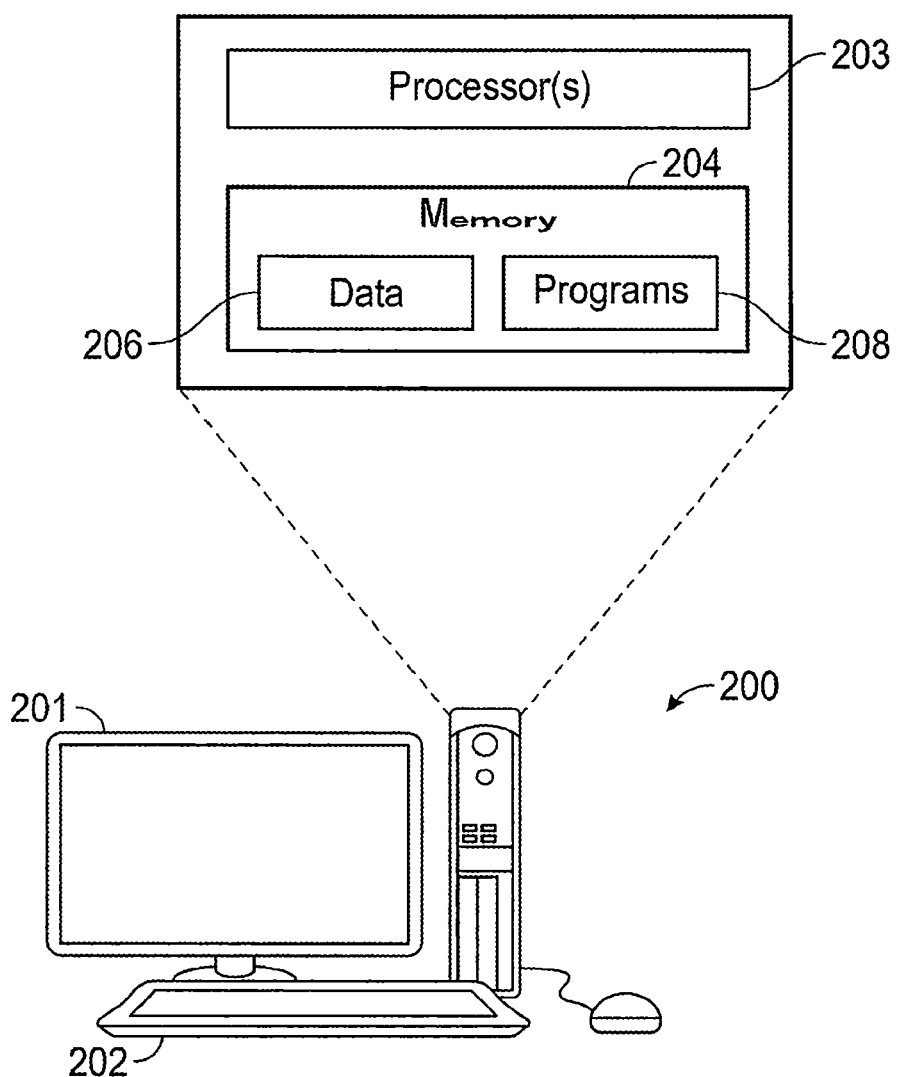
FIG. 2A is a schematic diagram of an example computer system.

FIG. 2A is a schematic diagram of an example computer system 200. The example computer system 200 includes a display device 201, an input device 202, processor(s) 203 and memory 204. The computer system 200 may include additional components, such as, for example, input/output controllers, communication links, etc. The computer system 200 can be used, for example, to analyze quantum information processing circuits. For instance, the computer system 200 may be used to implement one or more aspects of the example design process 210 shown in FIG. 2B, to perform one or more aspects of the example process 280 shown in FIG. 2D, or to perform other types of operations. The computer system 200 can be implemented as a classical computer that stores and processes information as classical bits.

The memory 204 can include, for example, a random access memory (RAM), a storage device (e.g., a writable read-only memory (ROM) or others), a hard disk, or another type of storage medium. The memory 204 can include various forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The computer system 200 can be preprogrammed or it can be programmed (and reprogrammed) by loading a program from another source (e.g., from a CD-ROM, from another computer device through a data network, or in another manner). The memory 204 can store instructions (e.g., computer code) associated with an operating system, computer applications, and other resources. The memory 204 can also store application data and data objects that can be interpreted by one or more applications or virtual machines running on the computer system 200. In the example shown in FIG. 2A, the memory 204 stores data 206 and programs 208.

An input/output controller can be coupled to input devices and output devices (e.g., the display device 201, the input device 202, or other devices) and to a communication link. In the example shown, the display device 201 is a computer monitor, and the input device 202 is a keyboard. The computer system 200 may include other types of input devices, output devices, or both (e.g., mouse, touchpad, touchscreen, microphone, motion sensors, etc.). The input devices and output devices can receive and transmit data in analog or digital form over communication links such as a serial link, a wireless link (e.g., infrared, radio frequency, or others), a parallel link, or another type of link.

The computer system 200 may be connected to a communication link, which may include any type of communication channel, connector, data communication network, or other link. For example, the communication link can include a wireless or a wired network, a Local Area Network (LAN), a Wide Area Network (WAN), a private network, a public network (such as the Internet), a WiFi network, a network that includes a satellite link, or another type of data communication network.

The programs 208 can include software applications, scripts, programs, functions, executables, or other modules that are interpreted or executed by the processor(s) 203. Such applications may include machine-readable instructions for performing one or more of the operations represented in FIGS. 2B or 2D. The programs 208 may include machine-readable instructions for generating a user interface or a plot, such as, for example, those represented in FIGS. 2C, 3A, 3B and 4C. The programs 208 can obtain input data from the memory 204, from another local source, or from one or more remote sources (e.g., via a communication link). The programs 208 can generate output data and store the output data in the memory 204, in another local medium, or in one or more remote devices (e.g., by sending the output data via the communication link). The programs 208 (also known as, software, software applications, scripts, or codes) can be written in any form of programming language, including compiled or interpreted languages, declarative or procedural languages. A computer program can be deployed to be executed on one computer or on multiple computers that are located at one site or distributed across multiple sites and interconnected by a communication network.

The processor(s) 203 can include any type of data processor that executes instructions, for example, to generate output data based on data inputs. For example, the processor(s) 203 can run the programs 208 by executing or interpreting the scripts, functions, executables, or other modules contained in the programs 208. The processor(s) 203 may perform one or more of the operations represented in FIG. 2B or 2D or generate one or more of the interfaces or plots, such as, for example, those represented in FIGS. 2C, 3A, 3B and 4C.

The processor(s) 203 can include various kinds of apparatus, devices, and machines for processing data, including, by way of example, a programmable data processor, a system on a chip, or multiple ones, or combinations, of the foregoing. The processor(s) 203 can include special purpose logic circuitry, e.g., an FPGA (field programmable gate array) or an ASIC (application specific integrated circuit). The processor(s) 203 can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The processor(s) 203 can include, by way of example, both general and special purpose microprocessors, and processors of any kind of digital computer.

Figure 2B:
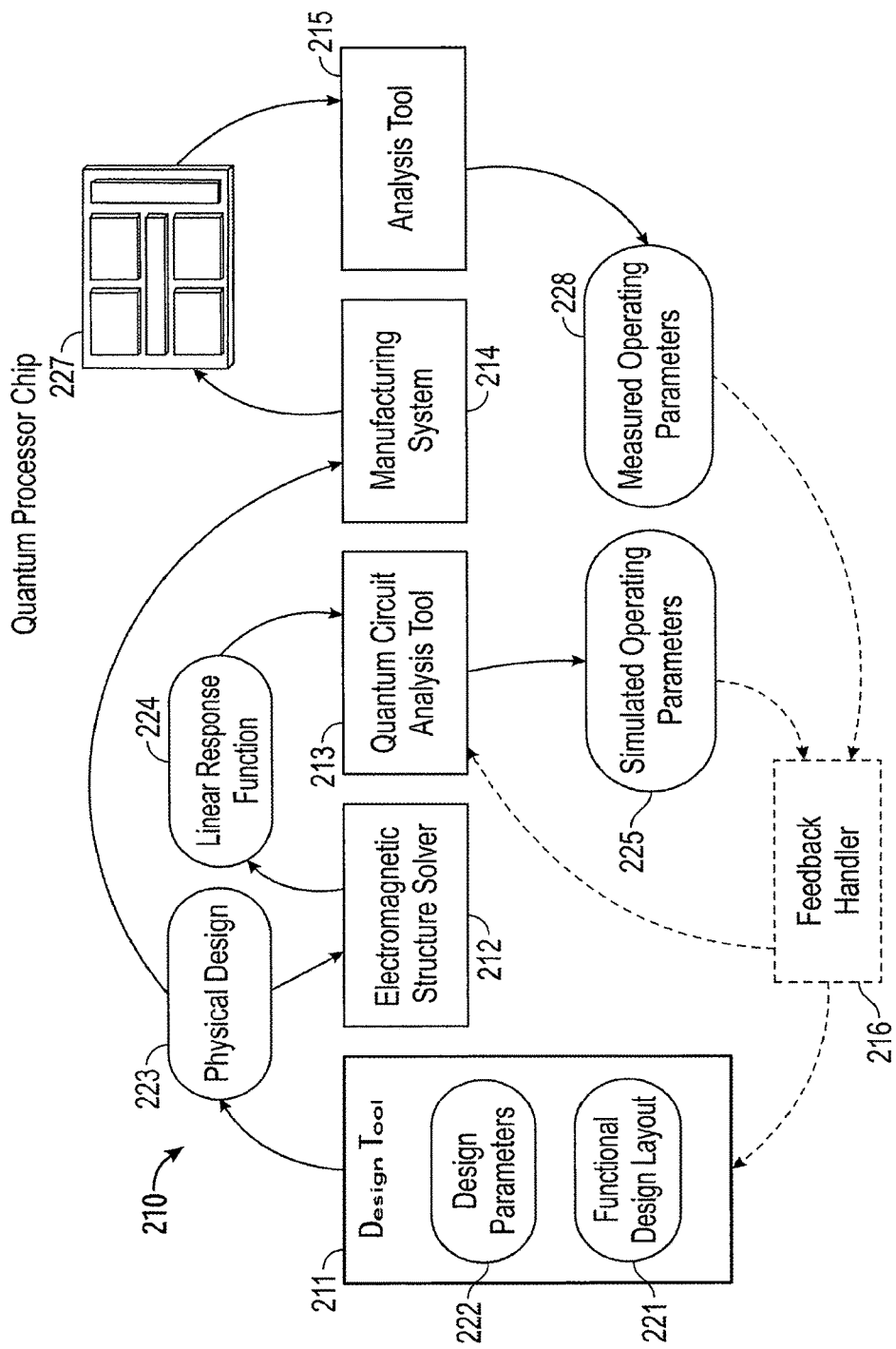
FIG. 2B is a workflow diagram of an example design process.

FIG. 2B is a workflow diagram of an example design process 210. The example design process 210 can be used, for example, to analyze, design, modify, or optimize quantum information processing circuits or other quantum integrated circuit devices or components, such as, for example, a qubit device, a quantum information processor, a quantum limited amplifier, etc. The example design process 210 includes operations performed by a design tool 211, an electromagnetic structure solver 212, a quantum circuit analysis tool 213, a manufacturing system 214, an analysis tool 215 and a feedback handler 216. In some implementations, the operations may be implemented by other types of systems, or one or more of the systems shown in FIG. 2B can be integrated, divided or otherwise configured.

In some examples, the design tool 211, the electromagnetic structure solver 212 and the quantum circuit analysis tool 213 are implemented as one or more programs executed by one or more processors in a computing system. In some cases, a computer system application (e.g., an installed or network-based software application) can include one or more of the design tool 211, the electromagnetic structure solver 212 and the quantum circuit analysis tool 213.

In some examples, the manufacturing system 214 and the analysis tool 215 are implemented as one or more systems in a microfabrication facility. For example, the manufacturing systems 214 may include wafer processing technology such as photolithography systems, etching systems, deposition systems, etc.; the analysis tool 215 may include measurement and testing systems configured to analyze integrated circuits, processor chip components, etc.

The example design tool 211 can generate a circuit specification for a quantum information processing circuit. As shown in FIG. 2B, the design tool 211 can access a functional design layout 221 and design parameters 222. The functional design layout 221 indicates a type of quantum information processing circuit to be built and specific components that will be needed (e.g., number of qubits, type of qubits, coupling of qubits, etc.). The design parameters 222 indicate desired operating parameters for each component of the quantum information processing circuit (e.g., qubit operating frequency, resonator operating frequency, Josephson junction energy, qubit coupling strength, etc.), which may be specified based on performance, cost, reliability considerations, or a combination of these and other factors. In some cases, the functional design layout 221 and the design parameters 222 are specified by user input, or they may be generated automatically based on circuit criteria or other information. The design tool 211 can process the functional design layout 221, design parameters 222 and possibly other information to produce the circuit specification 223.

The circuit specification 223 can indicate the layout and other properties of the quantum information processing circuit in a quantum processor chip. For example, the circuit specification 223 can indicate the material properties, geometric properties and location for each device or structure in the quantum information processing circuit. In some examples, the circuit specification 223 can include computer-readable data formatted as a solid model, a vector drawing, a boundary condition representing circuit elements or another type of format that can represent the physical structure of an electronic circuit.

The example electromagnetic structure solver 212 can receive the circuit specification 223 and analyze the quantum information processing circuit. For example, a physical layout for the quantum information processing circuit can be drawn or otherwise loaded in the workspace of a computer application based on the circuit specification 223, and the electromagnetic structure solver 212 can determine a linear response function 224 of the quantum information processing circuit. An example of an electromagnetic structure solver that can determine a linear response function is the HFSS software application (available from ANSYS® of Canonsburg, Pa., USA), which is a finite element electromagnetic structure solver; another type of electromagnetic structure solver can be used. The linear response function 224 determined by the electromagnetic structure solver 212 represents the linear component of the quantum information processing circuit. For example, the linear response function 224 can represent the impedance or admittance of the linear component 124 in the lumped circuit model 120 in FIG. 1B.

The quantum circuit analysis tool 213 can obtain the linear response function 224 from the electromagnetic structure solver 212 or another source. In some cases, the electromagnetic structure solver 212 exports the linear response function 224 and invokes the quantum circuit analysis tool 213 in response to stored instructions, in response to user input, or otherwise. For example, the quantum circuit analysis tool 213 may be invoked by a computer system application in response to a user selection of a button or other graphical user interface (GUI) object rendered by the computer system application. As an example, the quantum circuit analysis tool 213 may be invoked in response to a user selection of the quantum analysis button 248 shown in FIG. 2C. The quantum circuit analysis tool 213 may be invoked in another manner or in response to other types of input.

The quantum circuit analysis tool 213 can obtain the linear response function 224 of the quantum information processing circuit and determine simulated operating parameters 225 of the quantum information processing circuit based on the linear response function 224. The quantum circuit analysis tool 213 may obtain the linear response function 224 from the electromagnetic structure solver 212 or another source. In some cases, the quantum circuit analysis tool 213 determines the simulated operating parameters of the quantum information processing circuit using the example process 280 shown in FIG. 2D or in another manner.

In some implementations, the quantum circuit analysis tool 213 computes the simulated operating parameters 225 by executing a quantum simulation algorithm. For instance, the quantum circuit analysis tool 213 may import numerical data from the electromagnetic structure solver 212 and vector fit the numerical data to generate a fitted linear response function. The vector fitting can be performed, for example, using a software application such as MATLAB® (available from MATHWORKS® of Natick, Mass.) or another type of program. The quantum circuit analysis tool 213 may use a linear circuit synthesis algorithm to determine an equivalent linear circuit based on the fitted linear response function. The quantum circuit analysis tool 213 may apply positive-real and passivity conditions, for instance, to ensure the synthesized circuit is a finite physical circuit. If the equivalent linear circuit is not physical, the data may be rejected or the vector fitting can be repeated until the linear response function yields a physical circuit. The quantum circuit analysis tool 213 may determine the circuit parameters for the equivalent linear circuit and construct a circuit model (e.g., a Hamiltonian) for the equivalent linear circuit and the nonlinear components of the quantum information processing circuit. The simulated operating parameters 225 of the quantum information processing circuit may then be obtained by solving the circuit model (e.g., by solving the Schrödinger equation for the Hamiltonian or by other types of analysis).

The simulated operating parameters 225 can include, for example, a coherence time of a qubit device in the quantum information processing circuit, a resonance frequency of a qubit device in the quantum information processing circuit, a coupling strength between devices in the quantum information processing circuit, or a combination of these and other operating parameters. For instance, any of the example operating parameters shown in table 470 in FIG. 4D may be determined for one or more qubit devices, readout devices or other types of devices in a quantum information processing circuit.

In some cases, the simulated operating parameters 225 are provided to the feedback handler 216. The feedback handler 216 can determine whether the simulated operating parameters 225 comply with the design parameters 222, performance requirements or other criteria. In some cases, the feedback handler 216 determines that the circuit specification 223 should be modified, for instance, to improve one or more of the operating parameters of the quantum information processing circuit. In such cases, the design tool 211 can be invoked to modify the circuit specification 223. For example, the design tool 211 can modify material properties, geometric properties (e.g., length, height, width, shape, etc.) or locations of structures in the quantum information processing circuit. In some cases, the feedback handler 216 determines that quantum information processing circuit should be manufactured and tested, and the circuit specification 223 is provided to the manufacturing system 214.

The manufacturing system 214 can obtain the circuit specification 223 and manufacture a quantum processor chip 227 that includes the quantum information processing circuit according to the circuit specification 223. For example, design files or other data can be imported into a layout editor, masks can be prepared, fabrication limitations can be checked, and the resulting design can be manufactured. In some implementations, the quantum processor chip 227 is manufactured using fabrication systems such as, for example, photolithography systems, etching systems, deposition systems, etc.

The analysis tool 215 can obtain the quantum processor chip 227 and analyze (e.g., measure and characterize) one or more individual components of the physical quantum information processing circuit. In some cases, the analysis tool 215 determines one or more operating parameters based on physical measurements of the quantum processor chip 227. The measured operating parameters 228 can include, for example, a coherence time of a qubit device on the quantum processor chip 227, a resonance frequency of a qubit device on the quantum processor chip 227, a coupling strength between devices on the quantum processor chip 227, or a combination of these and other operating parameters. For instance, in some cases, one or more of the example operating parameters shown in table 470 in FIG. 4D may be obtained based on measurements of the quantum processor chip 227.

The measured operating parameters 228 can be provided to the feedback handler 216, which may analyze the measured operating parameters 228 or pass them to the design tool 211 or the quantum circuit analysis tool 213. The feedback handler 216 can determine whether the measured operating parameters 228 match the simulated operating parameters 225 or whether they comply with the design parameters 222, performance requirements or other criteria. In some cases (e.g., if the measured operating parameters 228 do not match the simulated operating parameters 225), the quantum circuit analysis tool 213 can modify the simulation parameters. For instance, the quantum circuit analysis tool 213 may use another type of circuit synthesis (e.g., the Brune circuit synthesis algorithm, the Foster circuit synthesis algorithm, etc.), the quantum circuit analysis tool 213 may take into account additional resonator modes, additional energy levels in the qubit device, or make other modifications in the simulation.

In some cases, the feedback handler 216 determines, based on the measured operating parameters 228, that the circuit specification 223 should be modified and invokes the design tool 211 to modify the circuit specification 223. For instance, the feedback handler 216 can invoke the design tool 211 to change the physical layout of the quantum information processing circuit, for example, by modifying the size, shape or location of linear or nonlinear circuit elements. In some cases, the feedback handler 216 determines that the functional design layout 221 or the design parameters 222 should be modified and instructs the design tool 211 accordingly. For example, the target parameters, types of components used, or other parameters may be modified. In such cases, the design tool 211 can generate a new circuit specification 223 based on the updated parameters and proceed with another iteration of the design process 210.

In some cases, the design process 210 is implemented as an iterative feedback process. The iterative feedback process can include one or more feedback loops, for instance, a simulation feedback loop, a testing feedback loop, or a combined simulation and testing feedback loop. The iterative feedback process can be managed, for example, by the feedback handler 216. The feedback handler 216 can manage the feedback loops based on performance criteria, optimization criteria or other factors. In some cases, the feedback handler 216 is configured to improve various performance criteria. For example, the feedback handler 216 may be configured to maximize coherence times; increase coherence times above a minimum threshold; reach target operating frequencies or coupling strengths for various devices in the quantum information processing circuit; reach operating frequencies and coupling strengths within a specified range; etc. In some cases, the iterative feedback process terminates upon reaching a predetermined performance criterion, upon reaching a predetermined number of iterations or predetermined runtime, or upon reaching another terminating condition.

In some iterations of the iterative feedback process, the circuit specification 223 may be modified based on the simulated operating parameters 225 from a prior iteration. For example, at least one iteration of the iterative feedback process can include the electromagnetic structure solver 212 obtaining a circuit specification 223 and determining a linear response function 224 for the current iteration of the feedback process; the quantum circuit analysis tool 213 determining simulated operating parameters 225 based on the linear response function 224 for the current iteration of the feedback process; and the design tool 211 modifying the circuit specification 223 for the next iteration of the feedback process.

In some iterations of the iterative feedback process, the circuit specification 223 may be modified based on measured operating parameters 228 from a prior iteration. For example, at least one iteration of the iterative feedback process can include the manufacturing system 214 obtaining the circuit specification 223 and manufacturing a quantum processor chip 227 for the current iteration of the feedback process; the analysis tool 215 obtaining measured operating parameters 228 of the quantum processor chip 227 manufactured for the current iteration of the feedback process; and the design tool 211 modifying the circuit specification 223 for the next iteration of the feedback process.

Figure 2C:
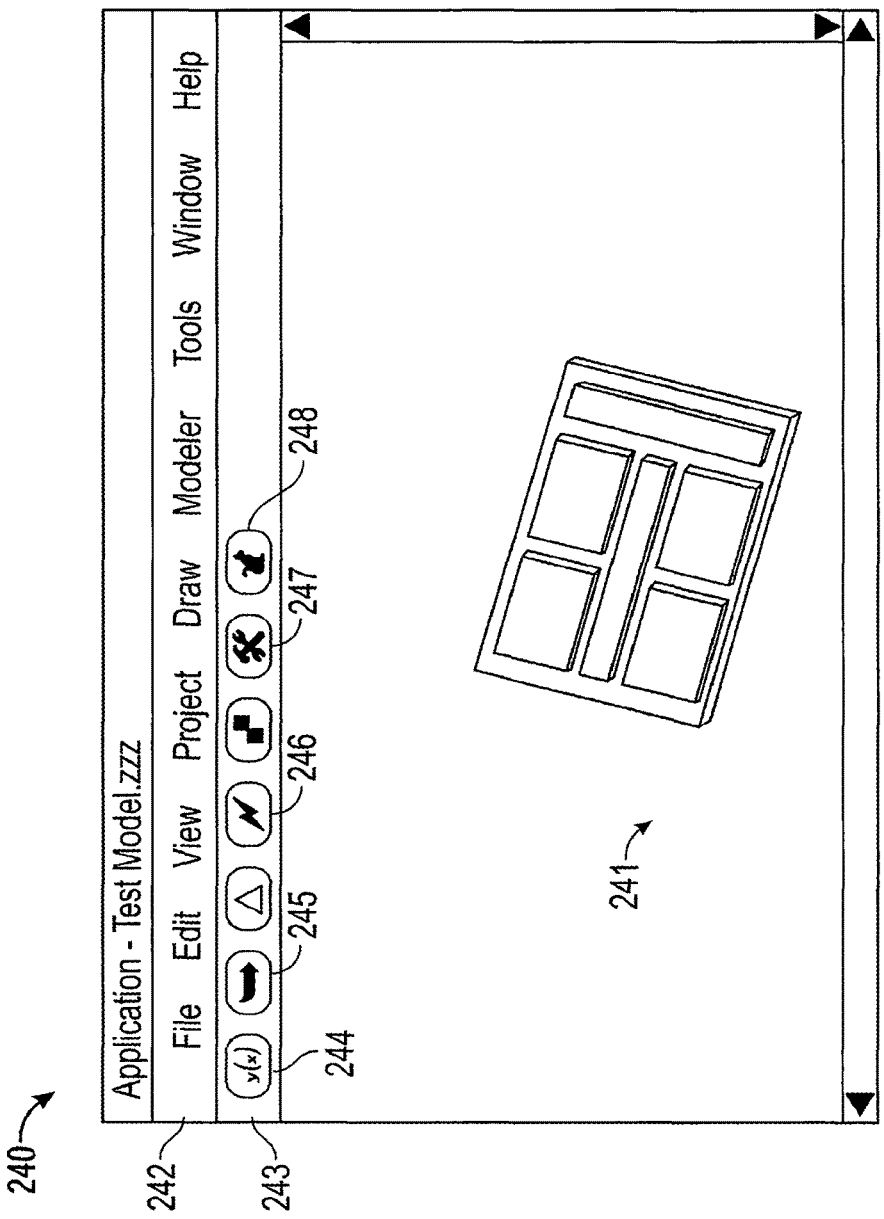
FIG. 2C is a screenshot of an example graphical user interface of a computer system application.

FIG. 2C is a screenshot of an example graphical user interface (GUI) 240 of a computer system application. The computer system application can be, for example, an installed or network-based software application that includes or has access to the design tool 211, the electromagnetic structure solver 212, the quantum circuit analysis tool 213 and other programs. The example GUI 240 can be generated, for example, by a processor in a computer system and rendered on a display device. The GUI 240 can receive user input based on a user's interactions with an input device, such as, for example, a mouse or other pointing device, a touch screen, etc. In response to the user input, the computer system application can modify the GUI 240, execute a program or take another type of action.

As shown in FIG. 2C, the example GUI 240 includes a workspace 241, a menu bar 242 and a tool bar 243. The workspace 241 can display a rendering of the quantum information processing circuit and receive user input, for example, to modify the quantum information processing circuit. The menu bar 242 provides user-selectable menus, which may appear as drop-down lists in response to a user selection. The menus can provide access to features of the computer system application, application data, etc.

The tool bar 243 includes multiple buttons that can be selected by the user, for example, to invoke pre-defined functions, embedded applications or other programs. The example tool bar 243 in FIG. 2C includes a linear response button 244, a load specification button 245, a feedback process button 246, an input parameter button 247 and a quantum analysis button 248. A tool bar may include additional or different features.

The input parameter button 247 can be selected by a user to provide input parameters to a design tool. For example, in response to a user selection of the input parameter button 247, the computer system application can obtain a functional design layout 221, design parameters 222 or other input parameters as shown in FIG. 2B. The computer system application may obtain the parameters, for example, by loading a parameter file, by prompting the user for input, or otherwise.

The load specification button 245 can be selected by a user to load a circuit specification for a quantum information processing circuit. For example, in response to a user selection of the load specification button 245, the computer system application can obtain a circuit specification 223 as shown in FIG. 2B. The computer system application may obtain the circuit specification, for example, by loading a specification file, by invoking a design tool (e.g., the design tool 211), by prompting the user for input, or otherwise.

The linear response button 244 can be selected by a user to generate numerical linear response data based on a circuit specification. For example, in response to a user selection of the linear response button 244, the computer system application can obtain a linear response function 224 as shown in FIG. 2B. The computer system application may obtain the linear response function, for example, by loading pre-computed numerical data, by invoking a solver (e.g., the electromagnetic structure solver 212) or otherwise.

The quantum analysis button 248 can be selected by a user to obtain operating parameters of a quantum information processing circuit based on the linear response function and other information, such as, for example, a nonlinear circuit model for a nonlinear component of the quantum information processing circuit. For example, in response to a user selection of the quantum analysis button 248, the computer system application can obtain simulated operating parameters 225 as shown in FIG. 2B. The computer system application may obtain the operating parameters, for example, by loading pre-computed data, by invoking a quantum solver (e.g., the quantum circuit analysis tool 213), by performing all or part of the example process 280 shown in FIG. 2D, or otherwise.

The feedback process button 246 can be selected by a user to process simulated or measured operating parameters of a quantum information processing circuit. For example, in response to a user selection of the feedback process button 246, the computer system application can modify a circuit specification 223 or a quantum simulation as shown in FIG. 2B. The computer system application may modify the circuit specification, for example, by invoking a design tool (e.g., the design tool 211) or otherwise. The computer system application may modify a quantum simulation, for example, by invoking a quantum solver (e.g., the quantum circuit analysis tool 213), or otherwise.

Figure 2D:
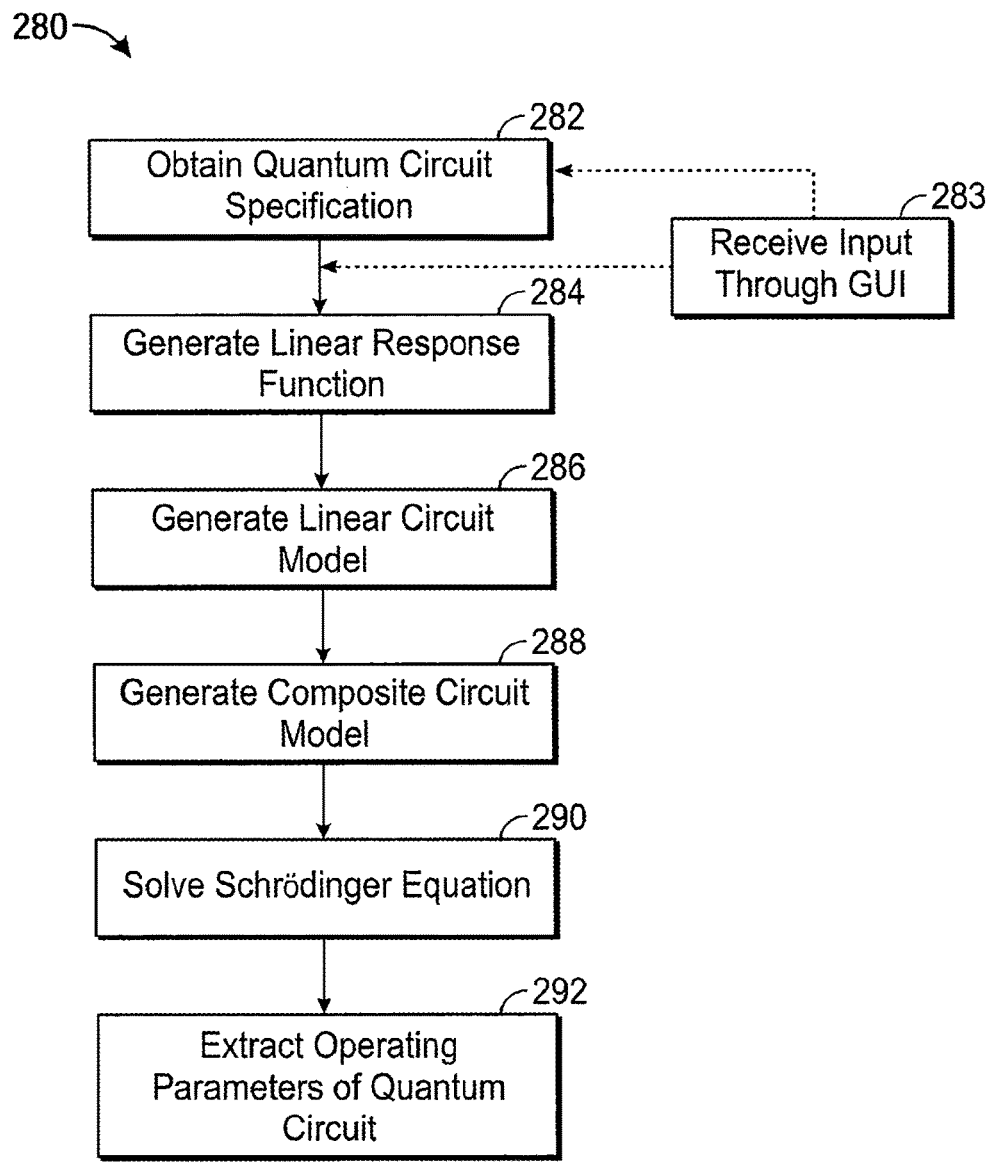
FIG. 2D is a flow diagram of an example process for analyzing a quantum information processing circuit.

FIG. 2D is a flow diagram of an example process 280 for analyzing a quantum circuit (e.g., a quantum information processing circuit) or another type of quantum system. All or part of the example process 280 can be performed by a computer system, for example, by executing one or more applications on a classical computer system. For instance, the operations in the process 280 may be performed by the processor(s) 203 executing one or more of the programs 208 in FIG. 2A. In some implementations, one or more operations in the process 280 can be performed by one or more of the subsystems shown in FIG. 2B, such as, for example, the design tool 211, the electromagnetic structure solver 212, the quantum circuit analysis tool 213 or a combination of one or more of them.

The example process 280 shown in FIG. 2D may include additional or different operations, and in some cases, one or more of the operations may be performed in another order. In some cases, one or more of the operations is repeated or iterated, for example, until a terminating condition is reached. In some cases, multiple operations can be combined or performed in parallel, or individual operations can be divided into multiple sub-operations.

At 282, a quantum circuit specification is obtained. The quantum circuit specification can be, for example, a circuit specification (e.g., the circuit specification 223 shown in FIG. 2B) for a quantum information processing circuit. The quantum circuit specification can indicate, for example, the material properties and the spatial layout of the circuit elements in a quantum information processing circuit. In some implementations, the quantum circuit specification is obtained based on tables of physical parameters for a design; the design can be modeled in the workspace of a computer application (e.g., a finite element electromagnetic structure solver), and the independent physical parameters can be manipulated or optimized in the workspace to produce the quantum circuit specification. In some implementations, the quantum circuit specification is obtained by importing or otherwise loading one or more files or data in an electromagnetic structure solver.

Figure 3A:
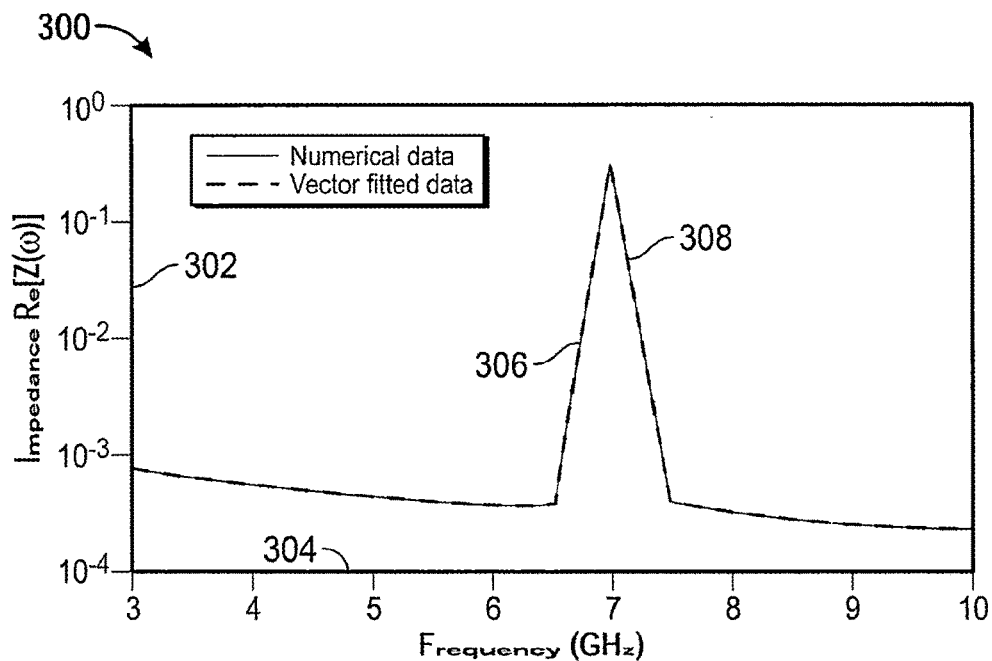
FIGS. 3A and 3B are plots showing the real and imaginary components of an example linear response function.
Figure 3B:
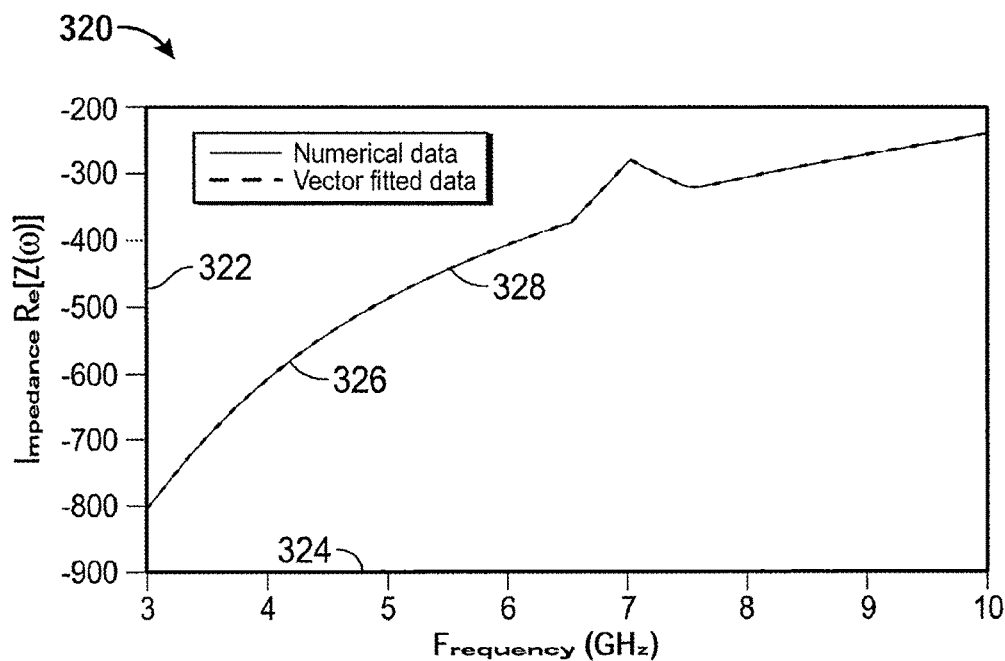

At 284, a linear response function is generated. For example, the linear response function of a quantum information processing circuit can be generated by a finite element electromagnetic structure solver or another type of program based on the quantum circuit specification for the quantum information processing circuit. The linear response function can formatted, for example, as numerical response data generated by the electromagnetic structure solver, as a fitted linear response function, or in another format. The linear response function can be an impedance function, an admittance function, or another type of linear response function. An example linear response function is shown in FIGS. 3A and 3B; other types of linear response functions can be generated.

In some cases, the linear response function can be generated with high accuracy by an electromagnetic structure solver such as, for example, HFSS software (available from ANSYS® of Canonsburg, Pa., USA) or another application. The numerical data for the linear response function (e.g., impedance, admittance, etc.) over a wide frequency range can be exported, for instance, in a vector form for a single-port model or in matrix form for a multi-port model. The numerical data can be vector fitted with an appropriate number of poles (e.g., using a vector fitting tool) and the linear response function can be generated in state-space form. The vector fitting can be configured to avoid under fitting or over fitting the data, for instance, to avoid an unphysical result. Passivity and positive real conditions can be enforced, for instance, so that the vector-fitted linear response function is synthesized to give a finite physical circuit.

At 286, a linear circuit model is generated. The linear circuit model can be generated based on the linear response function. In the example shown in FIG. 2B, the quantum circuit analysis tool 213 can obtain the linear response function 223 and generate the linear circuit model based on the linear response function 223. In some examples, the linear response function is used by a circuit synthesis algorithm to identify an equivalent linear circuit, and the equivalent linear circuit is used to construct the linear circuit model. For instance, the state-space Brune circuit synthesis algorithm or another classical circuit synthesis technique can be used to determine circuit parameters for an equivalent linear circuit based on the analytical linear response function obtained by fitting numerical linear response data, and the linear circuit model can be expressed as the Hamiltonian ($H_L$) for the equivalent linear circuit. An example of a Hamiltonian for an equivalent linear circuit is provided in Equation (1a) below. Other types of linear circuit models may be used. In some cases, the equivalent linear circuit is constrained to circuit elements that have low loss, for example, to get an accurate result.

Figure 4A:
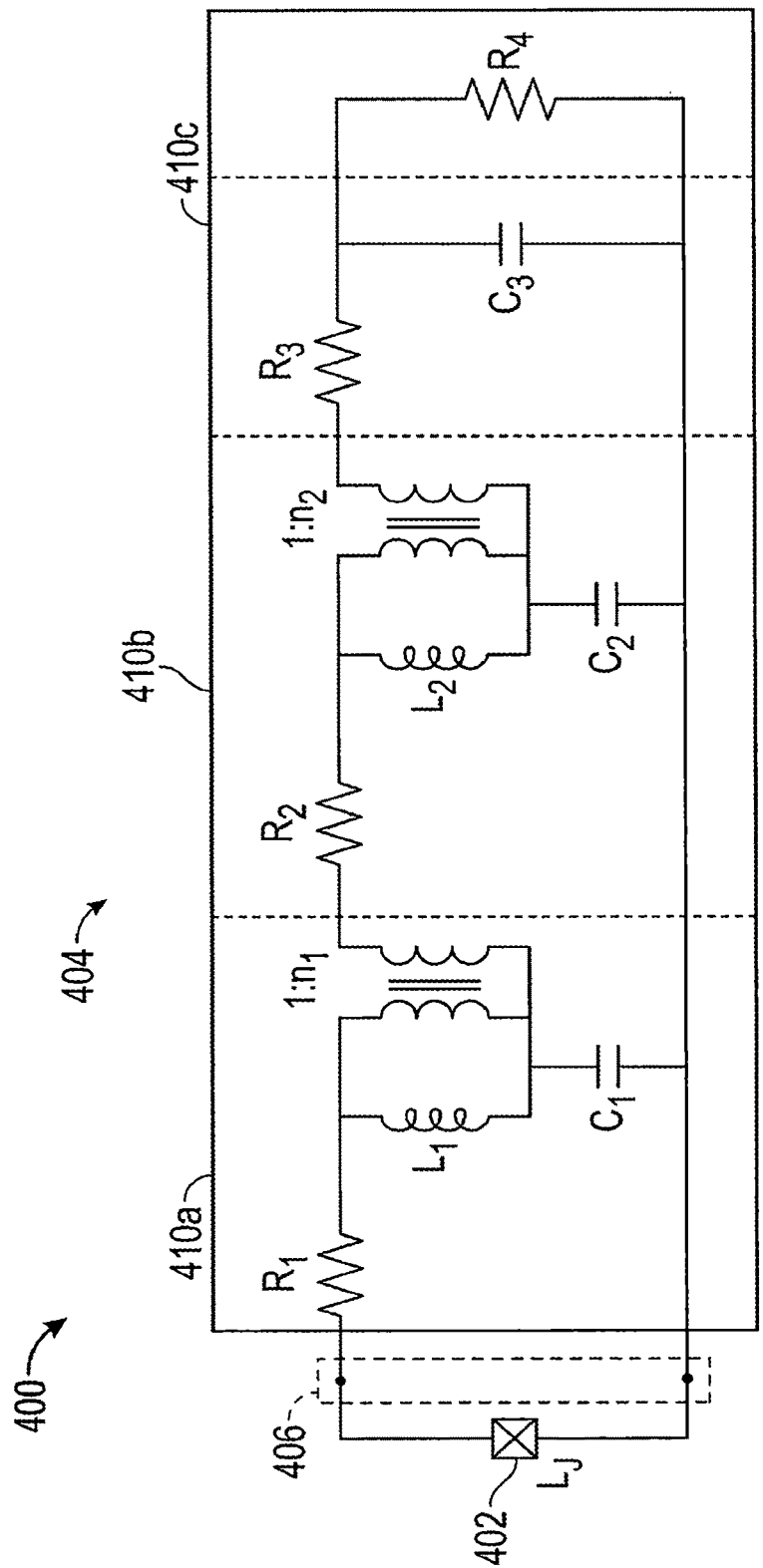
FIG. 4A is a schematic diagram of an example circuit model topology.

In some implementations, the linear circuit model represents a multi-mode resonator circuit. For example, the linear circuit topology 404 shown in FIG. 4A provides an example of a multi-mode resonator circuit. In some cases, the circuit topology of the multi-mode resonator circuit includes two, three, four, five or more stages. A circuit synthesis algorithm can determine circuit parameters for the multi-mode resonator circuit based on the linear response function and the circuit topology. The linear circuit model can then be generated based on the circuit parameters (e.g., the parameters shown in table 450 in FIG. 4B) and the circuit topology (e.g., the linear circuit topology 404 shown in FIG. 4A). The linear circuit model may be generated in another manner in some cases.

As shown at 283 in FIG. 2D, input may be received, for example, through a graphical user interface (GUI) or another type of interface, at various points in the example process 280. For instance, the example GUI 240 shown in FIG. 2C may receive input from a user, or input may be received from another source (e.g., from memory, from a remote data store, from another program, etc.). In some cases, input is received through the GUI at 282; for example, the GUI may include a data entry interface that allows the user to enter or select design parameters, a functional design layout or other inputs for the quantum circuit specification. In some cases, input is received through the GUI at 284; for example, the GUI may include a button that, when selected by a user, invokes a program that generates a linear response function based on a quantum circuit specification. In some cases, input is received through the GUI at 286; for example, the GUI may include a button that, when selected by a user, invokes a program that performs one or more of the subsequent operations (288, 290, 292) based on the linear response function.

At 288, a composite circuit model is generated. The composite circuit model can be generated based on combining the linear circuit model with a nonlinear circuit model. The nonlinear circuit model can represent the nonlinear circuit elements in the quantum information processing circuit, which may be specified in the quantum circuit specification. For instance, the linear circuit model can represent the linear component in a lumped circuit model of the quantum information processing circuit (e.g., the linear component 124 in the lumped circuit model 120 shown in FIG. 1B), and the nonlinear circuit model can represent the nonlinear component in a lumped circuit model of the quantum information processing circuit (e.g., the nonlinear component 122 in the lumped circuit model 120 shown in FIG. 1B).

In some cases, the nonlinear circuit model can be expressed as the Hamiltonian ($H_{NL}$) for the nonlinear circuit elements in the quantum information processing circuit. An example of a Hamiltonian for a nonlinear circuit element is provided in Equation (1b) below. Other types of nonlinear circuit models may be used. In some implementations, the nonlinear circuit model can be solved to account for two, three or more quantum energy levels. For example, the equations of motion for the nonlinear circuit model (or for a composite circuit model that includes the nonlinear circuit model) may be solved to account for three or more quantum energy levels of a transmon qubit device, a fluxonium qubit device, or another type of device that includes nonlinear elements. In some cases, including three or more energy levels in the solution to a circuit model can provide a more accurate model and account for additional physical phenomena, for instance, compared to a solution that includes only two quantum energy levels.

In some cases, the composite circuit model can be expressed as a composite Hamiltonian that is generated, for example, by combining (e.g., adding, merging or otherwise combining) the Hamiltonian ($H_L$) for the equivalent linear circuit with the Hamiltonian ($H_{NL}$) for the nonlinear circuit elements. In some cases, one or more Hamiltonian terms are quantized to form the composite circuit model. An example of a composite Hamiltonian (H) is provided in Equation (1) below, where $H=H_L+H_{NL}$. Other types of composite circuit models may be used.

At 290, the Schrödinger equation is solved for the composite circuit model. The Schrödinger equation can be solved numerically, for example, using a software application such as MATLAB® (available from MATHWORKS® of Natick, Mass.) or another type of program. The Schrödinger equation can be solved for the composite circuit model using all or a portion of the composite Hamiltonian discussed above. The Schrödinger equation can be solved to include a specified number of quantum energy levels of the quantum information processing circuit. For instance, the Schrödinger equation can be solved for two, three, four or more quantum energy levels. In some cases, including a greater number of quantum energy levels in the solution can provide greater accuracy or account for a broader range of phenomena that can affect the quantum information processing circuit.

In some implementations, the nonlinear circuit model represents a nonlinear element in a qubit device, and the quantum energy levels in the solution to the Schrödinger equation can include the two eigenstates of the qubit device that are used as the computational basis (e.g., the ground state and the first excited state) for quantum information processing. In some cases, the solution to the Schrödinger equation includes additional energy levels in the qubit device, for example, higher energy eigenstates that are not used by the qubit device for quantum information processing.

In some cases, the Schrödinger equation is solved to second order or higher. For instance, in some cases, two distinct operating parameters of the quantum information processing circuit can be obtained from a second order solution to the Schrödinger equation, three distinct operating parameters of the quantum information processing circuit can be obtained from a third order solution to the Schrödinger equation, etc. Thus, the number of coordinates needed characterize the operating parameters (e.g., decoherence rates, cross coupling, and frequencies, etc.) can be determined before or in conjunction with solving the Schrödinger equation. The corresponding Schrödinger equation can be solved with a specified level of accuracy, and the solutions of the Schrödinger equation can be used to extract operating parameters that are relevant to characterization of the quantum information processing circuit.

At 292, operating parameters of the quantum circuit are extracted. In some cases, the operating parameters can be extracted from the solution to the Schrödinger equation obtained at 290. In some cases, one or more of the operating parameters can be obtained by applying other equations, approximations or assumptions to the composite circuit model. The operating parameters can be or include, for example, the simulated operating parameters 225 in FIG. 2B. The operating parameters can be processed, stored, output or handled in another manner. In some cases, the operating parameters are displayed (e.g., in a GUI) to a user. In some implementations, the operating parameters are stored in database or in memory. In some implementations, the operating parameters are provided to a feedback handler and used in an optimization loop, for example, to modify the quantum circuit specification toward improving one or more of the operating parameters.

In some implementations, the operating parameters include parameters related to the stability of one or more devices in the quantum circuit, such as, for example, a coherence time of a qubit device. In some implementations, the operating parameters include parameters related to the addressability of one or more devices in the quantum circuit, such as, for example, an operating frequency of a qubit device or a resonator device. In some implementations, the operating parameters include parameters related to the readability of one or more devices in the quantum circuit, such as, for example, coupling strength between a qubit device and a readout device. In some cases, the operating parameters include one or more of the example operating parameters shown in table 470 in FIG. 4D.

In some implementations, the process 280 uses analytical techniques that can provide advantages compared to some other types of analysis. For instance, the process 280 may use exact impedance synthesis to obtain an equivalent physical finite circuit; the process 280 may model three or more quantum energy levels (e.g., of a qubit device or another type of nonlinear circuit element) to obtain more accurate representation of the quantum information processing circuit; the process may efficiently combine a classical electromagnetic solver (for linear components) and quantum mechanical analysis (for nonlinear components), for instance, to calculate multiple operating parameters in single-port circuit or a multi-port quantum circuit. In some cases, the process 280 can analyze cross coupling between qubit devices or other types of devices in a quantum information processing circuit.

FIGS. 3A, 3B, 4A, 4B, 4C and 4D show an example analysis of a single-port quantum information processing circuit. In this example, the process 280 shown in FIG. 2D is used to analyze an example circuit specification for the quantum information processing circuit 100 shown in FIG. 1A. In the circuit specification analyzed in this example, the qubit device 102 is a single-junction transmon qubit device, and the resonator device 104 is a three-dimensional (3D) cavity coupled to the qubit device 102. The example process 280 can be used to analyze another type of quantum circuit, which may have another topology or another circuit specification.

The linear response function of the quantum information processing circuit 100 shown in FIG. 1A was computed based on the example circuit specification in which a transmon qubit device is coupled to a 3D cavity. FIGS. 3A and 3B are plots 300, 320 showing the real and imaginary components of the example linear response function; FIG. 3A shows the real component; FIG. 3B shows the imaginary component. The example linear response function in FIGS. 3A and 3B is the impedance function $Z(\omega)$ as seen from the port of the Josephson junction in the transmon qubit device, which corresponds to the impedance produced by the linear component 124, as seen by the nonlinear component 122 in the lumped circuit model 120 shown in FIG. 1B.

The plots 300, 320 in FIGS. 3A, 3B show the numerical data produced by a finite element simulation and vector fitted data that is used to determine circuit parameters for an equivalent circuit. In particular, plot 300 shows numerical data 306 and vector fitted data 308 for $\mathrm{Re}[Z(\omega)]$, the real part of the impedance function; here, the vertical axis 302 indicates values for $\mathrm{Re}[Z(\omega)]$ while the horizontal axis 304 indicates the simulated values of the frequency $\omega$. Similarly, plot 300 shows numerical data 326 and vector fitted data 328 for $\mathrm{Im}[Z(\omega)]$, the imaginary part of the impedance function; here, the vertical axis 322 indicates values for $\mathrm{Im}[Z(\omega)]$ while the horizontal axis 324 indicates the simulated values of the frequency $\omega$. As shown in FIGS. 3A and 3B, the vector-fitted data closely follows the numerical data from the simulation. In this example, the numerical data was generated by a finite element simulation executed by HFSS software (available from ANSYS® of Canonsburg, Pa., USA). Linear response functions can be generated using other types of finite element electromagnetic structure solvers.

The vector fitted data shown in FIGS. 3A, 3B can be used to identify a linear circuit that emulates the linear component 124 of the lumped circuit model 120 in FIG. 1B. The linear circuit can be, for example, an equivalent linear circuit that produces the linear response function of the quantum information processing circuit 100. In some cases, the linear circuit is a single-mode resonator circuit (having a single resonance mode). In some cases, the linear circuit is a multi-mode resonator circuit (having multiple resonance modes).

FIG. 4A is a schematic diagram of the example circuit topology 400 that was used to construct a model of the quantum information processing circuit 100 in FIG. 1A, based on the linear response data shown in FIGS. 3A and 3B. The example circuit topology 400 includes nonlinear circuit topology 402 and linear circuit topology 404. The nonlinear circuit topology 402 can be used to model the nonlinear component 122 in the lumped circuit model 120 in FIG. 1B (which corresponds to the nonlinear element of the qubit device 102). The linear circuit topology 404 can be used to model the linear component 124 in the lumped circuit model 120 in FIG. 1B.

In the example shown in FIG. 4A, the linear circuit topology 404 corresponds to a multi-mode resonator circuit. The example multi-mode resonator circuit represented in FIG. 4A includes shunt resistance $R_4$ and three stages—a first stage 410a, a second stage 410b and a third stage 410c. A multi-mode resonator circuit may include a different number of stages (e.g., two, four, five, etc.), other types of stages, or stages that are arranged in another manner. The first stage 410a includes a resistance $R_1$, an inductance $L_1$ and a capacitance $C_1$, and is coupled to the second stage 410b by a transformer having a turn ratio 1:$n_1$. The second stage 410b includes a resistance $R_2$, an inductance $L_2$ and a capacitance $C_2$, and is coupled to the third stage 410c by a transformer having a turn ratio 1:$n_2$. The third stage 410c includes a resistance $R_3$ and a capacitance $C_3$, and is connected to a shunt resistance $R_4$. Thus, the first two stages 410a, 410b contain RLC circuits, while the third stage 410c contains an RC circuit. In the example shown in FIG. 4A, the nonlinear circuit topology 402 is the Josephson junction inductance $L_J$ of a transmon qubit device. As shown in FIG. 4A, the first stage 410a of the resonator circuit is connected to the Josephson junction inductance $L_J$ by a single port 406.

The example linear circuit topology 404 shown in FIG. 4A was used to identify a multi-mode resonator circuit that corresponds to the vector-fitted linear response data shown in FIGS. 3A and 3B. The circuit parameters of the multi-mode resonator circuit are shown in the table 450 in FIG. 4B. In particular, the following parameters were determined by an example implementation of the Brune circuit synthesis algorithm: for the first stage 410a, $C_1$=6.53×10$^{-5}$ nF, $L_1$=0.11 nH, $n_1$=0.04, $R_1$=2.30×10$^{-4}$ Ohms; for the second stage 410b, $C_2$=8.16×10$^{-5}$ nF, $L_2$=6226 nH, $n_2$=0.94, $R_2$=2.98 Ohms; for the third stage 410c, $C_3$=7.14×10$^{-5}$ nF, $R_3$=153.37 Ohms; and for the shunt resistor $R_1$=1.59×10$^{-9}$ Ohms.

Figures 4B, 4C, 4D:
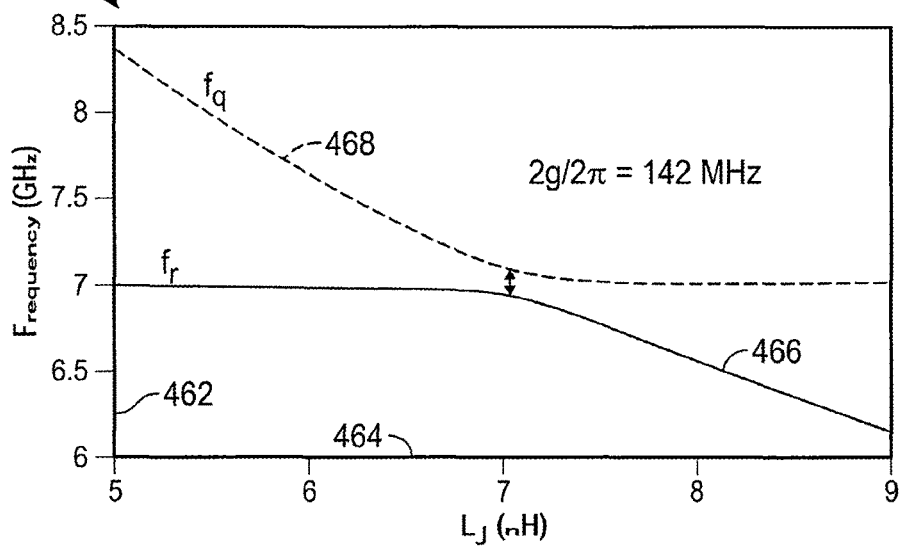
FIG. 4B is a table showing example circuit parameters for a linear circuit model.
FIG. 4C is a plot showing example resonance frequencies in a quantum information processing circuit.
FIG. 4D is a table showing example operating parameters of a quantum information processing circuit.

In the example shown in FIGS. 4A and 4B, the circuit parameters in the table 450 were determined using the Brune circuit synthesis algorithm based on the linear circuit topology 404 shown in FIG. 4A and the linear response function shown in FIGS. 3A and 3B. The linear circuit topology 404 in FIG. 4A together with the circuit parameters shown in the table 450 in FIG. 4B specify an equivalent linear circuit for the linear elements of the quantum information processing circuit 100. Because the multi-mode resonator circuit and the quantum information processing circuit 100 have equivalent linear response functions, the multi-mode resonator circuit can emulate the linear component 124 of the lumped circuit model 120 in FIG. 1B.

Since the linear circuit topology 404 has three stages, there are three coordinates (flux variables): $\Phi=\{\Phi_1, \Phi_2, \Phi_3\}$. The Hamiltonian for the full quantum information processing circuit, not including dissipation, has the form $$H = \frac{1}{2}Q^T C^{-1} Q - \left(\frac{\Phi_0}{2\pi}\right)^2 \frac{1}{L_J}\cos\varphi + \frac{1}{2}\Phi^T M \Phi \tag{1}$$

where $Q=\dot\Phi$ is the conjugate charge, $\varphi\equiv 2\pi\Phi_1/\Phi_0$ is the phase across the Josephson junction and $L_J=\Phi_0/2\pi I_c$, where $\Phi_0$=2.068×10$^{-15}$ Wb is the flux quantum and $I_c$ is the critical current. The capacitance C and inductance M matrices are $$C = \begin{pmatrix} n_1^2 C_1' & n_1 C_1' & 0 \\ n_1 C_1' & C_1' + n_2^2 C_2' & 0 \\ 0 & 0 & C_2' + C_3' \end{pmatrix},$$

$$M = \begin{pmatrix} 1/L_1' & 1/L_1' & 0 \\ 1/L_1' & 1/L_1' + 1/L_2' & 1/L_2' \\ 0 & 1/L_2' & 1/L_2' \end{pmatrix},$$

where $C_j'=C_j/(1-n_j)^2$ and $L_j'=L_j(1-n_j)^2$.

The Hamiltonian in Equation (1) is an example of a composite circuit model that represents a quantum information processing circuit. In this example, the first and third terms of the Hamiltonian in Equation (1) provide an example of a linear circuit model representing the linear component of the quantum information processing circuit:

$$H_L = \tfrac{1}{2} Q^T C^{-1} Q + \tfrac{1}{2}\Phi^T M \Phi. \tag{1a}$$

And the second term of the Hamiltonian in Equation (1) provides an example of a nonlinear circuit model representing the nonlinear component in the quantum information processing circuit (the Josephson junction):

$$H_{NL} = -\left(\frac{\Phi_0}{2\pi}\right)^2 \frac{1}{L_J}\cos\varphi. \tag{1b}$$

The linear circuit model $H_L$ can be added to the nonlinear circuit mode $H_{NL}$ to form the composite Hamiltonian H in Equation (1).

The Hamiltonian can be put in more convenient form to solve the Schrödinger equation, for example:

$$H = \frac{1}{2c}q^T q + \frac{\Phi_0^2}{4\pi^2}\left\{-L_J^{-1}\cos[c^{1/2}(C^{-1}f)_1]+\frac{1}{2}f^T\left(cC^{-\frac{1}{2}}MC^{-\frac{1}{2}}\right)f\right\} \tag{2}$$

where q=$c^{1/2}C^{-1/2}Q$, f=$c^{-1/2}C^{1/2}\varphi$ are the new variables satisfying the same commutation relation as Q and C. The subscript "1" in Equation (2) represents the coordinate for the Josephson junction. The number of indices increases with the number of Josephson junctions. Here c is a normalization capacitance. The time-independent Schrödinger equation can be generally expressed $$H\Psi = E\Psi \tag{3}$$

where E represents energy and $\Psi$ represents a wave function. In some implementations, the solution of the Schrödinger equation for the composite Hamiltonian in Equation (2) can give exact results. In general, the complexity of solving the Schrödinger equation grows with the number of "stages" (number of degrees of freedom) in the linear circuit topology. In some cases, instead of solving the full Schrödinger equation for all degrees of freedom, the variables of the circuits that give a frequency close to that of the qubit device can be identified, and the corresponding equation can be solved.

In some implementations, operating parameters of the quantum information processing circuit 100 can be obtained based on solving the Schrödinger equation for the Hamiltonian in Equation (2). For example, the decoherence rate of the qubit device 102, the respective operating frequencies of the qubit device 102 and the resonator device 104, and the coupling strength between the qubit device 102 and the resonator device 104 can be obtained in some cases.

In some implementations, to calculate the decoherence rates (1/$T_1$, 1/$T_2$) it is sufficient to identify one slow coordinate. The qubit relaxation rate of the qubit can be computed, for example, using the Fermi Golden formula $$\frac{1}{T_1} = 4|\langle 0|c^{1/2}m^T C^{-1/2}f|1\rangle|^2 J(\omega_q)\coth[\omega_q/2k_B T]$$

$$\frac{1}{T_2} = \frac{1}{2T_1} + \left|\langle 0|c^{\frac{1}{2}}m^T C^{-\frac{1}{2}}f|0\rangle - \langle 1|c^{\frac{1}{2}}m^T C^{-\frac{1}{2}}f|1\rangle\right|^2 \left.\frac{J(\omega_q)}{\omega}\right|_{\omega\to 0} 2k_B T$$

where m is the system-environment coupling vector and $J(\omega)$ is the spectral density of the environment, $\omega_q$ is the first transition frequency of the qubit and T is the temperature of the environment. The environment is modelled as bath of harmonic oscillators which are represented by the resistors in the equivalent circuit. Therefore, there will be a contribution to the decoherence rate from each resistor. For the example considered here, the system-environment coupling vectors can be written in a matrix form as $$m = (m_1 m_2 m_3 m_4) = \begin{pmatrix} -\frac{n_1 C_1}{1-n_1} & 0 & 0 & 0 \\ -\frac{C_1}{1-n_1} + \frac{C_2}{1-n_2} & \frac{C_2}{1-n_2} & 0 & 0 \\ \frac{C_2}{1-n_2} + C_3 & \frac{C_2}{1-n_2} + C_3 & C_3 & 0 \\ 0 & 0 & 0 & 1 \end{pmatrix}.$$

Here, the first three columns corresponds to the three in-series resistors and the last column is the coupling vector for shunting resistor.

To extract other quantum mechanical parameters that describe the coupled system such as eigenfrequencies, dispersive shift ($\chi$) and resonance coupling strength (g), one can solve the Schrödinger equations with two or more variables. For the example considered here, there are three stages and hence three degrees of freedom. Identifying the first two coordinates as the qubit and cavity, the two-dimensional Schrödinger equation $$\left[-\frac{4\pi^2}{\Phi_0^2}\frac{\hbar^2}{2c}\left(\frac{d^2}{df_1^2} + \frac{d^2}{df_2^2}\right) + u(f_1, f_2)\right]\psi_\alpha = E_\alpha \psi_\alpha(f_1, f_2)$$

can be solved. Using the solution of this equation, the following operating parameters of the quantum information processing circuit can be extracted: the operating frequency $f_q$ of the qubit device 102, the operating frequency $f_r$ of the resonator device 104, the dispersive shift ($\chi$) between the qubit device 102 and the resonator device 104, the resonance coupling strength (g) between the qubit device 102 and the resonator device 104, the anharmonicity ($\eta$) of the qubit device 102, the energy relaxation time ($T_1$) and dephasing time ($T_2$) of the qubit device.

In this example, the operating frequencies fall from the eigenvalues of the Schrödinger equation. Another operating parameter that can characterize a coupled qubit-resonator system is the dispersive coupling strength $\chi$ (also called the dispersive shift of the readout frequency, or the cavity pull). In some cases, the dispersive shift ($\chi$) can be calculated from $$2\chi = \omega_r^{|0\rangle} - \omega_r^{|1\rangle}$$

where $\omega_r^{|0\rangle}$, $\omega_r^{|1\rangle}$ are the resonator device eigenfrequencies when the qubit device is in the ground state $|0\rangle$ and the excited state $|1\rangle$, respectively. In some instances, this dispersive shift is accurate, for example, in sense that it includes contributions from higher modes of the resonator device 104 and higher energy levels of the qubit device 102.

In some implementations, the anharmonicity of the qubit device 102 can be defined as the difference between the $|0\rangle \to |1\rangle$ transition frequency and the $|1\rangle \to |2\rangle$ transition frequency, $\eta = \omega_{10} - \omega_{12}$.

FIG. 4C is a plot 460 showing example resonance frequencies in a quantum information processing circuit. In some implementations, the resonance coupling (g) between the qubit device 102 and the resonator device 104 can be calculated from the avoided crossing of the eigenfrequencies of the coupled qubit-readout system by sweeping through the Josephson junction inductance. For instance, the minimum separation of the two eigenfrequencies appear at resonance and the separation can be defined as twice the coupling strength between the two systems (2g). In FIG. 4C, the curve 468 indicates the operating frequency $f_q$ of the qubit device 102, and the curve 466 indicates the operating frequency $f_r$ of the resonator device 104 away from the resonance. The vertical axis 462 represents the operating frequencies of the devices, and the horizontal axis 464 indicates the Josephson junction inductance in units of nanohenrys (nH). As shown in the plot 460, for the example considered here, the avoided level crossing yields $2g/2\pi = 142$ MHz.

FIG. 4D is a table 470 showing example operating parameters of the quantum information processing circuit 100 obtained based on the example techniques described above. In particular, the following values were obtained: 4.537 GHz for the operating frequency $f_q$ of the qubit device 102, 7.050 for the operating frequency $f_r$ of the resonator device 104, 346 for the anharmonicity ($\eta/2\pi$) of the qubit device 102, 33 μs for the energy relaxation time ($T_1$) of the qubit device 102 at T=15 mK, 62 μs for the dephasing time ($T_2$) of the qubit device at T=15 mK, 0.25 MHz for the dispersive shift ($\chi/2\pi$) between the qubit device 102 and the resonator device 104, and 71 MHz for the resonance coupling strength ($g/2\pi$) between the qubit device 102 and the resonator device 104. Some of these parameters were also measured in a quantum processor chip containing a physical realization of the quantum information processing circuit 100. As shown in the table 470, the following values were obtained by measurement: 4.455 GHz for the operating frequency $f_q$ of the qubit device, 7.081 for the operating frequency $f_r$ of the resonator device, and 350 for the anharmonicity ($\eta/2\pi$) of the qubit device; measured values for the other operating parameters in the table 470 were not obtained.

The operating parameters can be calculated by other techniques. In some cases, classical calculations in a finite element electromagnetic structure solver can be used to estimate the dispersive shift $\chi$ of a resonance frequency in a quantum information processing circuit. As an example, a nonlinear component of the quantum information processing circuit can initially be modeled by a first linear component model. Using the first linear component model, Maxwell's equations can be solved, for example, by a finite element electromagnetic structure solver, to obtain a first eigenfrequency for the quantum information processing circuit. Then, the nonlinear component of the quantum information processing circuit can be modeled by a second, different linear component model that mimics a quantum excitation in the quantum information processing circuit. Using the second linear component model, Maxwell's equations can be solved, for example, by the finite element electromagnetic structure solver, to obtain a second eigenfrequency of the quantum circuit. The first and second sets of eigenfrequencies, which are computed using classical calculations, can then be used to compute the dispersive shift of a resonance frequency of a quantum information processing circuit.

As an example of determining the dispersive shift $\chi$ based on classical calculations, an electromagnetic structure solver can be used to compute the frequency of a qubit device by modeling the Josephson junction as a linear inductor. In this example, the calculation of the dispersive shift $\chi$ using the classical calculations can be implemented using two steps. In the first step, a resonator frequency can be computed by modeling the Josephson junction by a linear inductor $L_J^{(0)}$. Since in this model there is no photon that can promote the qubit to quantum energy level $|1\rangle$, this resonator frequency can be identified as $\omega_r^{|0\rangle}$. From an eigenmode simulation, the lowest eigenmode can also be identified as the qubit frequency, $\omega_{01}$. Knowing the linear inductance $L_J^{(0)}$ and the qubit frequency $\omega_{01}$, the total capacitance $C_\Sigma$ of a qubit device can be calculated using $$C_\Sigma = \frac{1}{L_J^{(0)} \omega_{01}^2}.$$

This provides a solution for a linear system comprised of a resonator and a linear inductor. Adding the linear inductor to the resonator structure gives rise to an additional mode, which can be identified as the qubit frequency. In order to mimic the nonlinearity of the qubit (still using the linear system), the anharmonicity $\eta$ can be computed assuming a nonlinear system using $\eta = e^2/2\hbar C_\Sigma$, where e is the electron charge and $\hbar = 1.0546 \times 10^{-34}$ Js is the reduced Planck's constant. For a nonlinear system this would provide the anharmonicity $\eta$. The $|1\rangle \to |2\rangle$ transition frequency can then be calculated using $\omega_{12} = \omega_{10} - \eta$. Knowing $\omega_{12}$, the corresponding inductance can be calculated from $$L_J^{(1)} = \frac{1}{C_\Sigma \omega_{12}^2}$$

for the same total capacitance $C_\Sigma$. In the second step, the linear inductance can be changed from $L_J^{(0)}$ to $L_J^{(1)}$ in the simulation without changing the meshing and boundary conditions (so that the total capacitance $C_\Sigma$ is unchanged), and the slightly changed resonator frequency can be calculated. This resonator frequency can be identified as $\omega_r^{|1\rangle}$. Although we have solved two independent linear systems, changing the inductance $L_J^{(0)}$ to $L_J^{(1)}$ mimics the excitation of the qubit from $|0\rangle \to |1\rangle$. Therefore, the dispersive shift $\chi$ is computed using $$2\chi = \omega_r^{|0\rangle} - \omega_r^{|1\rangle}.$$

In some implementations, a method of calculating a dispersive resonance frequency shift of a quantum information processing circuit can include modelling a nonlinear component of the quantum information processing circuit as linear component in a finite-element electromagnetic solver; solving for an eigenvalue of the approximate linear system; modifying the linear component to mimic the quantum excitation of the quantum information processing circuit; and recalculating the eigenvalue of the new approximate linear system.

In some implementations, a method of determining a dispersive shift of a resonance frequency of a quantum information processing circuit using a classical calculation includes modeling a nonlinear component of the quantum information processing circuit by a linear component model; solving Maxwell's equations to obtain an eigenfrequency using a finite-element electromagnetic structure solver; remodeling the nonlinear component by another linear component model to mimic the quantum excitation of the quantum information processing circuit; and resolving the Maxwell's equations using the other linear component model to obtain an eigenfrequency of the quantum information processing circuit using a finite-element electromagnetic structure solver. In some cases, the dispersive shift of a resonance frequency is computed by subtracting the second eigenfrequency from the first eigenfrequency. In some cases, the boundary conditions and the mesh in solving the Maxwell's equations is unchanged.

In some implementations, a classical calculation method for computing a dispersive frequency shift of a quantum processing circuit includes modelling the nonlinear component as an electromagnetic LC resonator; computing two eigenvalues of the quantum information processing circuit corresponding to two discrete inductance values of the LC resonator using a finite element electromagnetic solver; and computing the dispersive resonance frequency shift from the difference of the two eigenvalues.

Figure 5A:
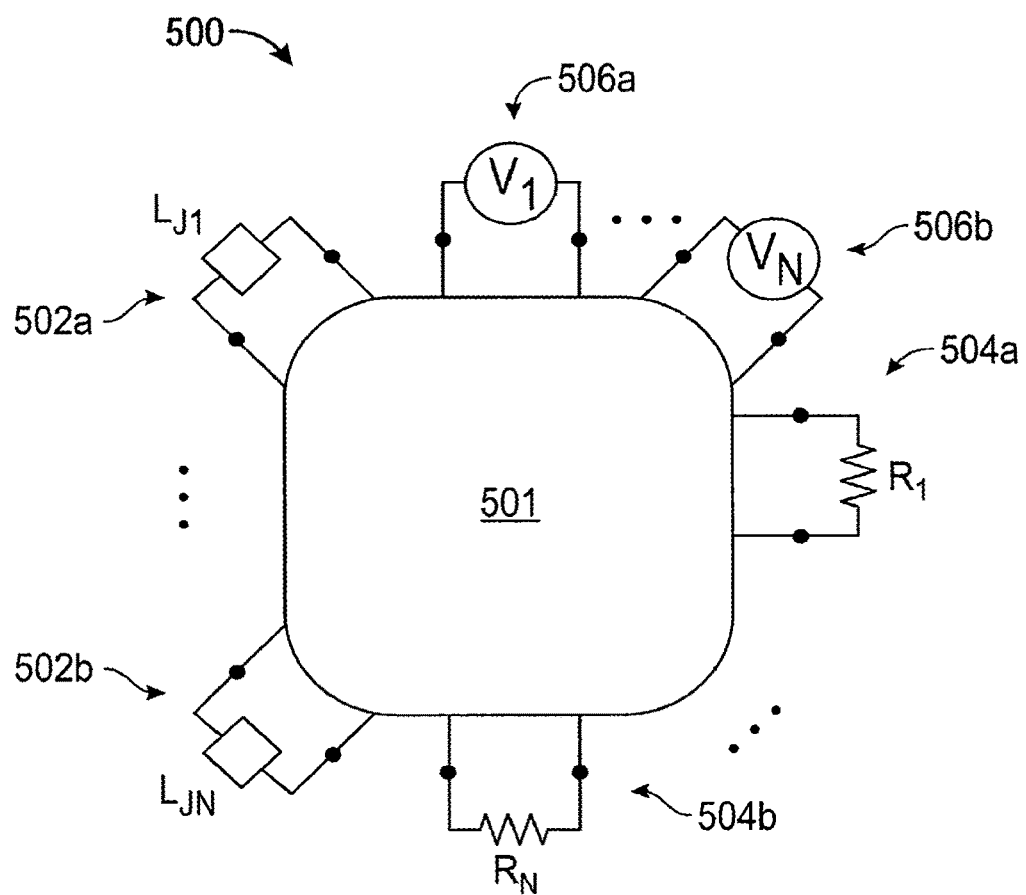
FIG. 5A is a schematic diagram of an example lumped circuit model for a multi-port quantum information processing circuit.

In some instances, the techniques described here can be applied to analyze multi-port quantum information processing circuits that include two or more nonlinear elements (e.g., two or more Josephson junctions). FIG. 5A is a schematic diagram of an example lumped circuit model 500 for a multi-port quantum information processing circuit. The example lumped circuit model 500 includes a linear multi-port system 501; multiple nonlinear qubit elements 502a, . . . , 502b; multiple voltage sources 506a, . . . , 506b, and multiple resistances 504a, . . . , 504b. In the example shown, the nonlinear qubit elements 502a, 502b are Josephson junctions in the qubit devices of a multi-port quantum information processing circuit. A multi-port quantum information processing circuit may include additional or different features, and the features can be arranged in another manner.

In the example shown in FIG. 5A, the linear multi-port system 501 represents the linear component of the multi-port quantum information processing circuit, analogous to the linear component 124 of the lumped circuit model 120 shown in FIG. 1B. The linear multi-port system 501 can be used to compute the linear response function (e.g., impedance, admittance or scattering matrix) using a finite element electromagnetic solver. The ports of the linear multi-port system 501 can be connected to Josephson junctions, voltage sources, impedance connectors to high frequency lines, etc. The linear response numerical data can be used to obtain a positive real linear response matrix function at each frequency. Using this linear response function, an equivalent linear circuit can be identified by applying classical circuit synthesis (e.g., the Brune synthesis algorithm) in state-space, and imposing the positive real condition can ensure the existence of a finite physical circuit.

Figure 5B:
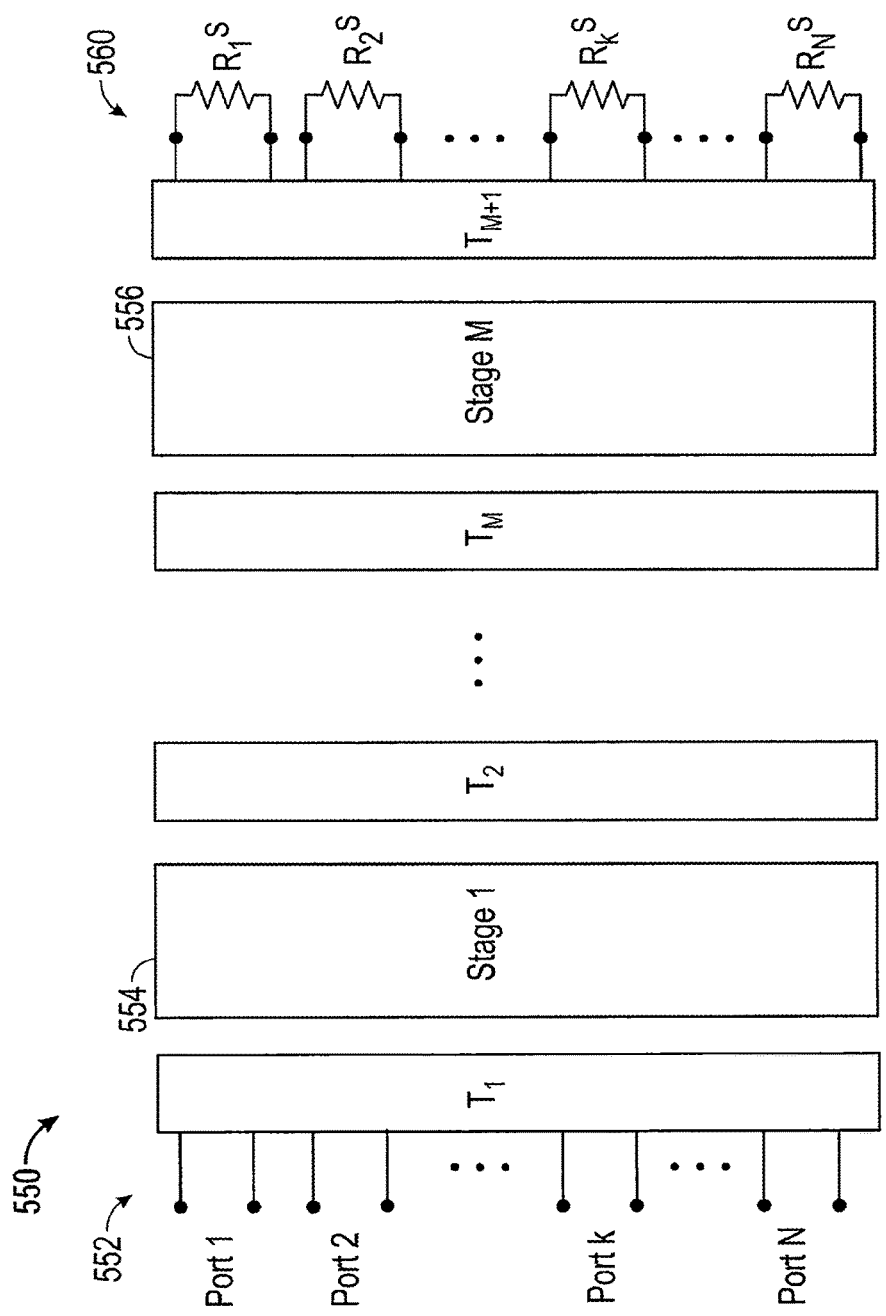
FIG. 5B is a schematic diagram of an example circuit model topology.

FIG. 5B is a schematic diagram of an example multi-port circuit model topology 550 for analyzing a multi-port quantum information processing circuit. As shown in FIG. 5B, the multi-port circuit model topology 550 represents N ports 552 with M stages (the first stage 554 and the mth stage 556 are shown in FIG. 5B. The N ports 552 (on the right) are shunted by Josephson junctions, resistances, voltage sources or other elements, while the circuit corresponding to each port is shunted by a resistor $R_K^S$ (on the right at 560). The construction of the Hamiltonian and dissipation (decoherence) analysis for the multi-port circuit model topology 550 can follow the technique described above for the single-port quantum processor circuit analysis. The equivalent circuit also includes a transformer at the beginning and end of each stage. The circuit model topology 500 of the synthesized equivalent linear circuit for the multi-port model can be used to construct a composite circuit model for a quantum information processing circuit that includes multiple qubit devices, and the composite circuit model can be used to extract operating parameters of the quantum information processing circuit.

In some implementations, the state space Brune circuit synthesis algorithm can be used to determine circuit parameters based on the circuit model topology 550 and the linear response function of the linear multi-port system 501. First, the transformer turn ratio matrix can be extracted using the vector fitted multi-port linear response function. The single-port state space Brune circuit synthesis algorithm can then be used to construct the equivalent linear circuit. A multi-port version of the positive real condition can also be enforced, for example, to ensure the existence of a physical finite circuit. Multi-port quantum processor circuit quantization and characterization can be used, for example, to study cross-coupling among qubits in quantum device, which may indicate performance parameters and limitations of the quantum information processing circuit. In some cases, multi-port quantum processor circuit analysis can selectively address each individual circuit element and its properties.

In a general aspect of what is described here, one or more operating parameters of a quantum information processing circuit are determined. A linear response function of a quantum information processing circuit is generated. A linear circuit model is generated based on the linear response function. A composite circuit model is generated by combining the linear circuit model and a nonlinear circuit model. An operating parameter of the quantum information processing circuit is computed by solving the composite circuit model.

Implementations of the general aspects and other aspects of what is described here may include one or more of the following features. The linear response function can be a linear impedance function, a linear admittance function or a scattering matrix function. The linear response function can be generated using a finite element electromagnetic structure solver to simulate the quantum information processing circuit.

Implementations of the general aspects and other aspects of what is described here may include one or more of the following features. The linear circuit model can represent a multi-mode resonator circuit. Circuit parameters of the multi-mode resonator circuit can be obtained based on the linear response function and a circuit topology of the multi-mode resonator circuit. The linear circuit model can be generated based on the circuit parameters and the circuit topology. The circuit parameters of the multi-mode resonator circuit can be determined by an algorithm that imposes a passivity condition and a positive real condition on the multi-mode resonator circuit. The linear circuit model can be a first Hamiltonian representing the multi-mode resonator circuit. The nonlinear circuit model can be a second Hamiltonian representing the nonlinear component in the quantum information processing circuit. The composite circuit model can be a composite Hamiltonian that is generated by combining the first Hamiltonian with the second Hamiltonian. Obtaining the operating parameter can include solving the Schrödinger equation for the composite Hamiltonian. Multiple operating parameters can be determined based on a second order or higher order solution to the Schrödinger equation.

Implementations of the general aspects and other aspects of what is described here may include one or more of the following features. The quantum information processing circuit can be a single-port quantum information processing circuit that includes a qubit device. The quantum information processing circuit can be a multi-port quantum information processing circuit that includes multiple nonlinear components. The composite circuit model can be generated based on the linear circuit model and nonlinear circuit models that represent the respective nonlinear components in the quantum information processing circuit.

Implementations of the general aspects and other aspects of what is described here may include one or more of the following features. The composite circuit model can be solved to include three or more quantum energy levels in the quantum information processing circuit. The quantum information processing circuit can include a qubit device, and composite circuit model can be solved to include three or more quantum energy levels of the qubit device.

Implementations of the general aspects and other aspects of what is described here may include one or more of the following features. One or more operating parameters can be obtained by solving the composite circuit model, or all operating parameters of the quantum processor can be obtained by solving the composite circuit model. The operating parameter can include one or more of a coherence time of a qubit device in the quantum information processing circuit, a resonance frequency of a qubit device in the quantum information processing circuit, or a coupling strength between devices in the quantum information processing circuit.

In another general aspect of what is described here, a quantum information processing circuit is designed. A circuit specification of a quantum information processing circuit is obtained. An electromagnetic structure solver, executed by one or more processors in a computer system, determines a linear response function of the quantum information processing circuit based on the circuit specification. A quantum circuit analysis tool, executed by one or more of the processors in the computer system, determines simulated operating parameters of the quantum information processing circuit based on the linear response function. The circuit specification is modified based on the simulated operating parameters.

Implementations of the general aspects and other aspects of what is described here may include one or more of the following features. A computer system application can include the electromagnetic structure solver, the quantum circuit analysis tool, and a graphical user interface. The computer system application can invoke the quantum circuit analysis tool in response to input received through the graphical user interface. The graphical user interface can include a quantum analysis button, and the input can be a user selection of the quantum analysis button.

Implementations of the general aspects and other aspects of what is described here may include one or more of the following features. A quantum processor chip is manufactured based on the modified circuit specification. A measured operating parameter of the quantum processor chip is obtained, and the modified circuit specification is further modified based on the measured operating parameter.

Implementations of the general aspects and other aspects of what is described here may include one or more of the following features. An iterative feedback process that includes multiple iterations. The iterative feedback process can be an optimization loop configured to optimize one or more operating parameters of the quantum information processing circuit. At least one of the iterations can include obtaining a current circuit specification for a current iteration of the feedback process; generating a linear response function for the current iteration based on the current circuit specification; determining simulated operating parameters for the current iteration based on the linear response function for the current iteration; and based on the simulated operating parameters for the current iteration, modifying the current circuit specification for the next iteration of the feedback process. At least one of the iterations can include obtaining a current circuit specification for a current iteration of the feedback process; manufacturing a quantum processor chip for the current iteration based on the current circuit specification; obtaining a measured operating parameter of the quantum processor chip manufactured for the current iteration; and based on the measured operating parameters, modifying the current circuit specification for the next iteration of the feedback process.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A method of determining physical operating parameters of a quantum information processing circuit, the method comprising:
   by operation of a design tool executed by one or more processors in a computer system, generating a circuit specification for a quantum information processing circuit comprising a qubit device;
   storing the circuit specification in a memory of the computer system;
   loading the circuit specification from the memory into a workspace of an electromagnetic structure solver executed by one or more processors in the computer system;
   by operation of the electromagnetic structure solver, analyzing the quantum information processing circuit to obtain a linear response function of the quantum information processing circuit, wherein the linear response function represents a linear component of the quantum information processing circuit, and wherein obtaining the linear response function comprises imposing a passivity condition and a positive real condition on a fitted linear response function;
   storing the linear response function in the memory of the computer system; and
   by operation of a quantum circuit analysis tool executed by one or more processors in the computer system:
      accessing the linear response function from the memory;
      determining circuit parameters of a multi-mode resonator circuit based on the linear response function and a circuit topology of the multi-mode resonator circuit, wherein the circuit parameters of the multi-mode resonator circuit are determined using a Brune circuit synthesis algorithm;
      generating a linear circuit model based on the circuit parameters and the circuit topology, wherein the linear circuit model comprises a first Hamiltonian representing the multi-mode resonator circuit;
      generating a composite circuit model based on combining the linear circuit model and a nonlinear circuit model, the nonlinear circuit model comprising a second Hamiltonian representing a nonlinear component in the quantum information processing circuit, wherein generating the composite circuit model comprises generating a composite Hamiltonian by combining the first Hamiltonian with the second Hamiltonian;
      computing a numerical solution to the Schrödinger equation for the composite Hamiltonian, wherein the numerical solution comprises at least three quantum energy levels of the qubit device in the quantum information processing circuit;
      extracting physical operating parameters of the quantum information processing circuit from the numerical solution to the Schrödinger equation, wherein the physical operating parameters include a coherence time of the qubit device and a resonance frequency of the qubit device; and
      storing the physical operating parameters in the memory of the computer system;
   by operation of the design tool, modifying the circuit specification based on the physical operating parameters; and
   manufacturing a quantum processor chip based on the modified circuit specification.

2. The method of claim 1, comprising obtaining multiple operating parameters of the quantum information processing circuit based on a second order or higher order solution to the Schrödinger equation.

3. The method of claim 1, wherein the quantum information processing circuit comprises a single-port quantum information processing circuit that includes the qubit device.

4. The method of claim 1, wherein the quantum information processing circuit comprises a multi-port quantum information processing circuit that includes multiple nonlinear components, and the method comprises generating the composite circuit model based on the linear circuit model and nonlinear circuit models that represent the respective nonlinear components in the quantum information processing circuit.

5. The method of claim 1, wherein the physical operating parameter further comprise a resonance frequency of a resonator device in the quantum information processing circuit.

6. The method of claim 1, wherein the physical operating parameter further comprise a coupling strength between devices in the quantum information processing circuit.

7. The method of claim 1, wherein the physical operating parameters further comprise a dispersive shift of a resonator device frequency in the quantum information processing circuit.

8. A system comprising:
   one or more processors; and
   a computer-readable medium storing instructions that, when executed by the one or more processors, perform operations comprising:
      by operation of a design tool, generating a circuit specification for a quantum information processing circuit comprising a qubit device;
      storing the circuit specification in a memory of the computing system;
      loading the circuit specification from the memory into a workspace of the electromagnetic structure solver;

by operation of the electromagnetic structure solver, analyzing the quantum information processing circuit to obtain a linear response function of the quantum information processing circuit, wherein the linear response function represents a linear component of the quantum information processing circuit, and wherein obtaining the linear response function comprises imposing a passivity condition and a positive real condition on a fitted linear response function;

storing the linear response function in the memory of the computing system; and by operation of a quantum circuit analysis tool:
accessing the linear response function from the memory;
determining circuit parameters of a multi-mode resonator circuit based on the linear response function and a circuit topology of the multi-mode resonator circuit, wherein the circuit parameters of the multi-mode resonator circuit are determined using a Brune circuit synthesis algorithm;
generating a linear circuit model based on the circuit parameters and the circuit topology, wherein the linear circuit model comprises a first Hamiltonian representing the multi-mode resonator circuit;
generating a composite circuit model based on combining the linear circuit model and a nonlinear circuit model, the nonlinear circuit model comprising a second Hamiltonian representing a nonlinear component in the quantum information processing circuit, wherein generating the composite circuit model comprises generating a composite Hamiltonian by combining the first Hamiltonian with the second Hamiltonian;
computing a numerical solution to the Schrödinger equation for the composite Hamiltonian, wherein the numerical solution comprises at least three quantum energy levels of the qubit device in the quantum information processing circuit;
extracting physical operating parameters of the quantum information processing circuit from the numerical solution to the Schrödinger equation, wherein the physical operating parameters include a coherence time of the qubit device and a resonance frequency of the qubit device; and
storing the physical operating parameters in the memory of the computing system; and by operation of the design tool, modifying the circuit specification based on the physical operating parameters; and a manufacturing system configured to manufacture a quantum processor chip based on the modified circuit specification.

9. The system of claim 8, the operations comprising obtaining multiple operating parameters of the quantum information processing circuit based on a second order or higher order solution to the Schrödinger equation.

10. The system of claim 8, wherein the operating parameters further include a resonance frequency of a resonator device in the quantum information processing circuit and a coupling strength between the qubit device and the resonator device.

11. The system of claim 8, further comprising a display device that displays a graphical user interface (GUI), wherein the quantum circuit analysis tool is executed in response to input received through the GUI.

12. A method for designing quantum information processing circuits, the method comprising:
by operation of a design tool executed by one or more processors in a computer system, generating a circuit specification for a quantum information processing circuit comprising a qubit device;
storing the circuit specification in a memory of the computer system;
by operation of an electromagnetic structure solver executed by one or more processors in the computer system, accessing the circuit specification from the memory and determining a linear response function of the quantum information processing circuit based on the circuit specification, wherein the linear response function represents a linear component of the quantum information processing circuit, and wherein determining the linear response function comprises imposing a passivity condition and a positive real condition on a fitted linear response function;
storing the linear response function in the memory of the computer system;
by operation of a quantum circuit analysis tool executed by one or more processors in the computer system:
accessing the linear response function from the memory;
determining circuit parameters of a multi-mode resonator circuit based on the linear response function and a circuit topology of the multi-mode resonator circuit, wherein the circuit parameters of the multi-mode resonator circuit are determined using a Brune circuit synthesis algorithm;
generating a linear circuit model based on the circuit parameters and the circuit topology, wherein the linear circuit model comprises a first Hamiltonian representing the multi-mode resonator circuit;
generating a composite circuit model based on combining the linear circuit model and a nonlinear circuit model, the nonlinear circuit model comprising a second Hamiltonian representing a nonlinear component in the quantum information processing circuit, wherein generating the composite circuit model comprises generating a composite Hamiltonian by combining the first Hamiltonian with the second Hamiltonian;
computing a numerical solution to the Schrödinger equation for the composite Hamiltonian, wherein the numerical solution comprises at least three quantum energy levels of the qubit device in the quantum information processing circuit;
determining physical operating parameters of the quantum information processing circuit from the numerical solution to the Schrödinger equation, wherein the physical operating parameters include a coherence time of the qubit device and a resonance frequency of the qubit device; and
storing the physical operating parameters in the memory of the computer system; and
by operation of a feedback handler executed by one or more processors in the computer system, invoking the design tool to modify the circuit specification based on the physical operating parameters; and
manufacturing a quantum processor chip based on the modified circuit specification.

13. The method of claim 12, wherein a computer system application comprises the electromagnetic structure solver, the quantum circuit analysis tool, and a graphical user interface, and the computer system application invokes the quantum circuit analysis tool in response to input received through the graphical user interface.

14. The method of claim 13, wherein the graphical user interface includes a quantum analysis button, and the input comprises a user selection of the quantum analysis button.

15. The method of claim 12, further comprising:
obtaining a measured operating parameter of the quantum processor chip; and
further modifying the modified circuit specification based on the measured operating parameter.

16. The method of claim 12, comprising performing an iterative feedback process that includes multiple iterations, wherein at least one of the iterations includes:
obtaining a current circuit specification for a current iteration of the feedback process;
generating a linear response function for the current iteration based on the current circuit specification;
determining simulated operating parameters for the current iteration based on the nonlinear component model and the linear response function for the current iteration; and
based on the simulated operating parameters for the current iteration, modifying the current circuit specification for the next iteration of the feedback process.

17. The method of claim 16, wherein the iterative feedback process comprises an optimization loop configured to optimize one or more operating parameters of the quantum information processing circuit.

18. The method of claim 16, wherein at least one of the iterations includes:
obtaining a current circuit specification for a current iteration of the feedback process;
manufacturing a quantum processor chip for the current iteration based on the current circuit specification;
obtaining a measured operating parameter of the quantum processor chip manufactured for the current iteration; and
based on the measured operating parameters, modifying the current circuit specification for the next iteration of the feedback process.

19. The method of claim 12, wherein the linear response function comprises at least one of an impedance function, an admittance function or a scattering matrix.

20. The method of claim 12, wherein the physical operating parameters further comprise a resonance frequency of a resonator device in the quantum information processing circuit.

21. The method of claim 12, wherein the physical operating parameters further comprise a coupling strength between devices in the quantum information processing circuit.

22. A system comprising:
one or more processors; and
a computer-readable medium storing instructions that, when executed by the one or more processors, perform operations comprising:
by operation of a design tool, generating a circuit specification for a quantum information processing circuit comprising a qubit device;
storing the circuit specification in a memory of the computing system;
executing an electromagnetic structure solver to determine a linear response function of the quantum information processing circuit based on the circuit specification, wherein the linear response function represents a linear component of the quantum information processing circuit, and wherein determining the linear response function comprises imposing a passivity condition and a positive real condition on a fitted linear response function;
storing the linear response function in the memory of the computing system;
executing a quantum circuit analysis tool to:
access the linear response function from the memory;
determine circuit parameters of a multi-mode resonator circuit based on the linear response function and a circuit topology of the multi-mode resonator circuit, wherein the circuit parameters of the multi-mode resonator circuit are determined using a Brune circuit synthesis algorithm;
generate a linear circuit model based on the circuit parameters and the circuit topology, wherein the linear circuit model comprises a first Hamiltonian representing the multi-mode resonator circuit;
generate a composite circuit model based on combining the linear circuit model and a nonlinear circuit model, the nonlinear circuit model comprising a second Hamiltonian representing a nonlinear component in the quantum information processing circuit, wherein generating the composite circuit model comprises generating a composite Hamiltonian by combining the first Hamiltonian with the second Hamiltonian;
compute a numerical solution to the Schrödinger equation for the composite Hamiltonian, wherein the numerical solution comprises at least three quantum energy levels of the qubit device in the quantum information processing circuit;
determine physical operating parameters of the quantum information processing circuit from the numerical solution to the Schrödinger equation, wherein the physical operating parameters include a coherence time of the qubit device and a resonance frequency of the qubit device; and
store the physical operating parameters in the memory of the computing system; and
executing a feedback handler to invoke the design tool to modify the circuit specification based on the physical operating parameters; and
a manufacturing system configured to manufacture a quantum processor chip based on the modified circuit specification.

23. The system of claim 22, further comprising a display device that displays a graphical user interface of an application executed by the one or more processors, wherein the application invokes the quantum circuit analysis tool in response to input received through the graphical user interface.

24. The system of claim 23, wherein the graphical user interface includes a quantum analysis button, and the input comprises a user selection of the quantum analysis button.

25. The system of claim 22, the operations comprising an iterative feedback process that includes multiple iterations, wherein at least one of the iterations includes:
obtaining a current circuit specification for a current iteration of the feedback process;
generating a linear response function for the current iteration based on the current circuit specification;
determining simulated operating parameters for the current iteration based on the linear response function for the current iteration; and based on the simulated operating parameters for the current iteration, modifying the current circuit specification for the next iteration of the feedback process.

26. The system of claim 22, wherein the physical operating parameters further include a resonance frequency of a resonator device in the quantum information processing circuit, and a coupling strength between the qubit device and the resonator device.

* * * * *